United States Patent
Kato et al.

(10) Patent No.: US 12,481,445 B2
(45) Date of Patent: *Nov. 25, 2025

(54) PROCESSING SYSTEM AND PROCESSING METHOD FOR NEURAL NETWORK

(71) Applicant: Preferred Networks, Inc., Tokyo (JP)

(72) Inventors: Tatsuya Kato, Tokyo (JP); Ken Namura, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,328

(22) Filed: May 31, 2023

(65) Prior Publication Data
US 2023/0305729 A1 Sep. 28, 2023

Related U.S. Application Data

(63) Continuation of application No. 16/837,121, filed on Apr. 1, 2020, now Pat. No. 11,704,041.

(30) Foreign Application Priority Data

Apr. 3, 2019 (JP) ................. 2019-071557

(51) Int. Cl.
*G06F 3/06* (2006.01)
*G06F 9/30* (2018.01)
(Continued)

(52) U.S. Cl.
CPC .......... *G06F 3/0647* (2013.01); *G06F 3/0604* (2013.01); *G06F 3/0673* (2013.01);
(Continued)

(58) Field of Classification Search
CPC .... G06F 3/0604; G06F 3/0647; G06F 3/0673; G06F 9/30036; G06F 9/30145;
(Continued)

(56) References Cited

U.S. PATENT DOCUMENTS 11,586,926 B2 * 2/2023 Wang .................... G06N 3/048
2010/0122071 A1 5/2010 Yoshikawa et al.
(Continued)

FOREIGN PATENT DOCUMENTS

JP 2018-018220 2/2018
JP 2018-120547 8/2018
(Continued)

OTHER PUBLICATIONS

Aurelien Geron, "Hands-On Machine Learning with Scikit-Learn and TensorFlow Concepts, Tools and Techniques to Build Intelligent Systems", (Apr. 25, 2018), pp. 299-300, Sep. 14, 2018.

*Primary Examiner* — Eric T Oberly
(74) *Attorney, Agent, or Firm* — IPUSA, PLLC

(57) ABSTRACT

A processing system includes a first chip including one or more first processors, and a second chip including one or more second processors. For a weight of a neural network to be updated, the one or more second processors execute a backward operation of the neural network and calculate a gradient of the weight, the calculated gradient is transferred to the one or more first processors, and the one or more first processors update the weight based on the calculated gradient. The one or more first processors transfer the updated weight to the second chip. The one or more first processors update the weight of the neural network in accordance with a method using multiple types of parameters.

20 Claims, 16 Drawing Sheets

(51) Int. Cl.
  *G06F 9/38* (2018.01)
  *G06F 13/16* (2006.01)
  *G06F 13/40* (2006.01)
  *G06N 3/04* (2023.01)
  *G06N 3/063* (2023.01)
  *G06N 3/084* (2023.01)

(52) U.S. Cl.
  CPC ...... *G06F 9/30036* (2013.01); *G06F 9/30145* (2013.01); *G06F 9/3887* (2013.01); *G06F 13/1668* (2013.01); *G06F 13/4022* (2013.01); *G06F 13/4027* (2013.01); *G06N 3/04* (2013.01); *G06N 3/063* (2013.01); *G06N 3/084* (2013.01)

(58) Field of Classification Search
  CPC ............... G06F 9/3887; G06F 13/1668; G06F 13/4022; G06F 13/4027; G06N 3/04; G06N 3/063; G06N 3/084
  See application file for complete search history.

(56) References Cited

U.S. PATENT DOCUMENTS

| | | |
|---|---|---|
| 2018/0032911 A1 | 2/2018 | Yamazaki et al. |
| 2018/0181829 A1 | 6/2018 | Morozov et al. |
| 2018/0253401 A1 | 9/2018 | Cardinaux et al. |
| 2018/0307986 A1* | 10/2018 | Kabul ............... G06F 9/46 |
| 2019/0026157 A1 | 1/2019 | Suzuki et al. |
| 2019/0080233 A1* | 3/2019 | Procter ............... G06N 3/045 |
| 2019/0212982 A1 | 7/2019 | Yoda et al. |
| 2019/0332944 A1 | 10/2019 | Bai et al. |
| 2019/0377513 A1 | 12/2019 | Park et al. |
| 2019/0384574 A1 | 12/2019 | Fujii et al. |
| 2020/0134473 A1 | 4/2020 | Miyato |
| 2020/0193296 A1* | 6/2020 | Dixit ............... G06N 3/063 |
| 2020/0293866 A1* | 9/2020 | Guo ............... G06F 16/9024 |
| 2021/0043331 A1 | 2/2021 | Ozcan et al. |

FOREIGN PATENT DOCUMENTS

| | | |
|---|---|---|
| JP | 2020-003860 | 1/2020 |
| WO | 2019/004350 | 1/2019 |

* cited by examiner

FIG.5

<EXEMPLARY LAYER ALGORITHM IN FORWARD OPERATION>
For (b: B)
  For (oc: Oc)
    For (ic: Ic)
      $D_{N+1}[b][oc] += D_N[b][ic] * W_N[oc][ic]$ $D_{N+1}$···OUTPUT DATA FROM LAYER   $D_N$ ···INPUT DATA INTO LAYER   $W_N$···PARAMETER
B···NUMBER OF DATA ELEMENTS   Oc···NUMBER OF OUTPUT CHANNELS   Ic ···NUMBER OF INPUT CHANNELS

<EXEMPLARY LAYER ALGORITHM IN BACKWARD OPERATION>
CALCULATE INPUT ERROR:
For (b: B)
  For (oc: Oc)
    For (ic: Ic)
      $\Delta D_N[b][ic] += \Delta D_{N+1}[b][oc] * W_N[oc][ic]$ CALCULATE PARAMETER ERROR:
For (b: B)
  For (oc: Oc)
    For (ic: Ic)
      $\Delta W_N[oc][ic] += \Delta D_{N+1}[b][oc] * D_N[b][ic]$ $\Delta D_{N+1}$···DATA ERROR RECEIVED FROM OUTPUT SIDE LAYER IN FORWARD OPERATION
$\Delta D_N$ ···DATA ERROR FED TO INPUT SIDE LAYER IN FORWARD OPERATION
$\Delta W_N$···PARAMETER ERROR   $W_N$···PARAMETER   $D_N$···INPUT DATA
B···NUMBER OF DATA ELEMENTS   Oc···NUMBER OF OUTPUT CHANNELS   Ic ···NUMBER OF INPUT CHANNELS

FIG.6

| Momentum-SGD | $V_t = \gamma V_{t-1} - \eta \Delta W_t$<br>$W_t = W_{t-1} - V_t$ | TWO MULTIPLICATIONS<br>TWO ADDITIONS AND SUBTRACTIONS |
|---|---|---|
| ADAM | $M_t = \beta_1 M_{t-1} + (1-\beta_1)\Delta W_t$<br>$V_t = \beta_2 V_{t-1} + (1-\beta_2)\Delta W_t^2$<br>$W_t = W_{t-1} - \alpha M_t / (\sqrt{V_t} + \varepsilon)$ | SIX MULTIPLICATIONS<br>SIX ADDITIONS AND SUBTRACTIONS<br>CALCULATION OF SQUARE ROOT<br>DIVISION |

FIG.16
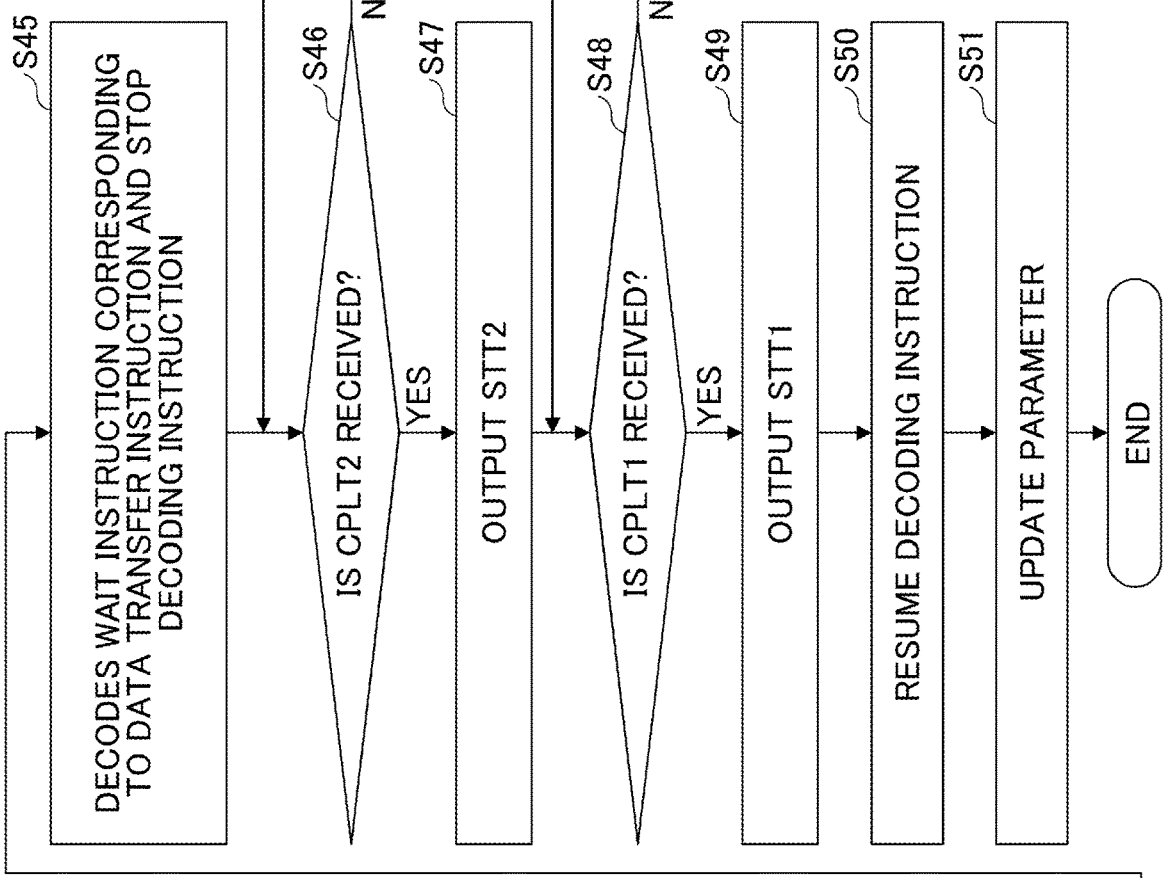
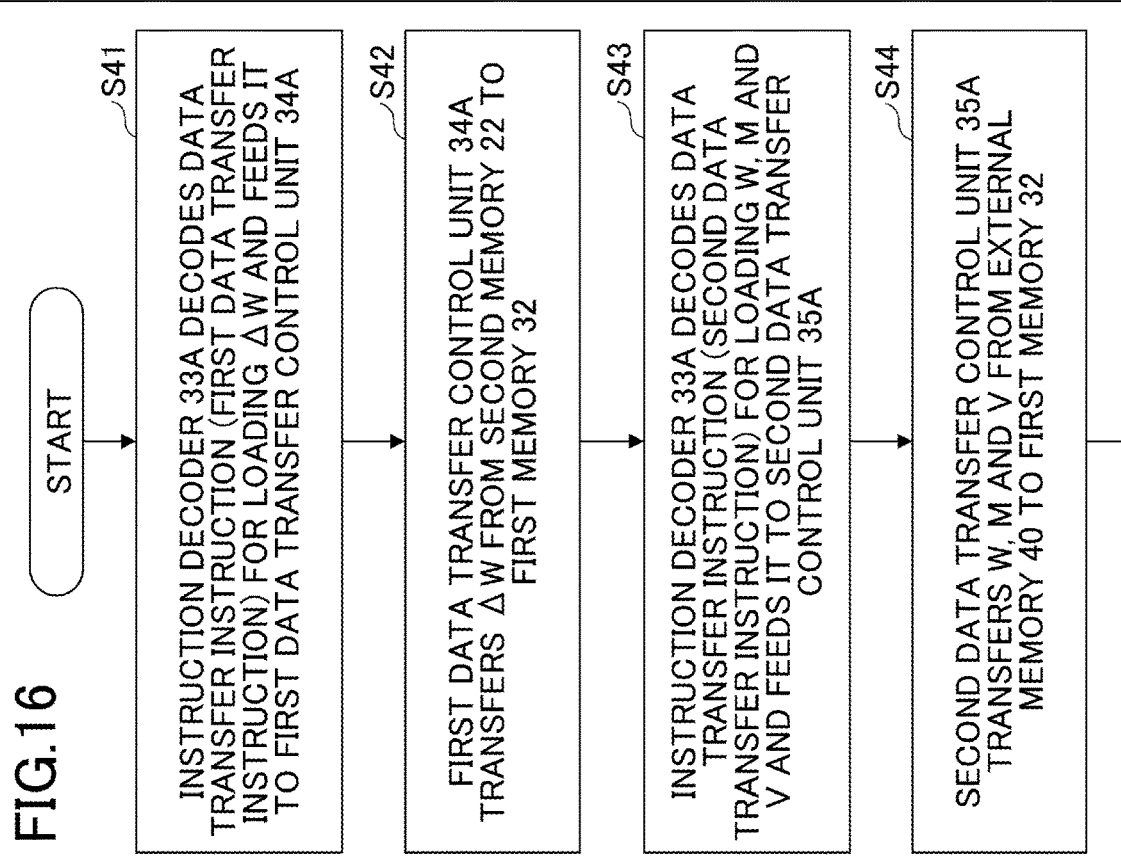

PROCESSING SYSTEM AND PROCESSING METHOD FOR NEURAL NETWORK

CROSS-REFERENCE TO RELATED APPLICATIONS

The present application is a continuation of U.S. patent application Ser. No. 16/837,121 filed on Apr. 1, 2020, which is based on and claims priority to Japanese patent application No. 2019-071557 filed on Apr. 3, 2019 with the Japanese Patent Office, the entire contents of which are hereby incorporated by reference.

BACKGROUND

1. Technical Field

The disclosure herein relates to an integrated circuit, a semiconductor device, a semiconductor module, an information processing apparatus and a control method for the semiconductor device.

2. Description of the Related Art

Recently, image recognition, speech recognition and others have been accurately achieved by deep learning using neural networks. For example, a processor for execution of the deep learning uses image data, weight data or the like loaded from a main memory as an external memory to an internal memory to cause a plurality of arithmetic units to perform operations in parallel. At this time, an array such as the image data, the weight data or the like stored in the internal memory is converted and fed to processor cores, so that the calculation can be performed efficiently.

SUMMARY

In general, in the deep learning, the number of parameters for use in respective layers of a neural network may be often smaller than the number of data pieces supplied to the layers. Therefore, when the parameters are input/output to/from an external memory in processing a layer algorithm, the full band of the external memory may not be used, and thus memory resources may be insufficiently utilized. In addition, when the parameters are updated in a semiconductor device including a large number of arithmetic units implemented to perform the processing of the layer algorithm, there are cases where reduced utilization efficiency of the arithmetic units may lead to insufficient utilization of arithmetic resources.

One aspect of the present disclosure relates to a processing system including a first chip including one or more first processors, and a second chip including one or more second processors. For a weight of a neural network to be updated, the one or more second processors execute a backward operation of the neural network and calculate a gradient of the weight, the calculated gradient is transferred to the one or more first processors, and the one or more first processors update the weight based on the calculated gradient. The one or more first processors transfer the updated weight to the second chip. The one or more first processors update the weight of the neural network in accordance with a method using multiple types of parameters.

Another aspect of the present disclosure, relates to an integrated circuit, comprising: a first arithmetic part including a first arithmetic unit and a first memory, wherein the first arithmetic unit performs an operation and the first memory stores data for use in the first arithmetic unit; and a first data transfer control unit that controls transfer of data between the first memory and a second memory of a second arithmetic part including a second arithmetic unit, wherein the second arithmetic part communicates with an external memory via the first arithmetic part.

A further aspect of the present disclosure relates to a semiconductor device, comprising: a first arithmetic part; and a second arithmetic part, wherein the first arithmetic part includes: a first arithmetic unit that performs an operation; a first memory that stores data for use at the first arithmetic unit; and a first data transfer control unit that controls transfer of data between the first memory and a second memory of the second arithmetic part, and the second arithmetic part includes: a plurality of second arithmetic units that perform operations, wherein the second memory stores data for use at the plurality of second arithmetic units, and the second arithmetic part communicates with an external memory via the first arithmetic part.

A still further aspect of the present disclosure relates to a semiconductor module, comprising: a plurality of the above-stated integrated circuits or a plurality of the above-stated semiconductor devices.

A still further aspect of the present disclosure relates to an information processing apparatus, comprising: a plurality of the above-stated integrated circuits, a plurality of the above-stated semiconductor devices or a plurality of the above-stated semiconductor modules.

A still further aspect of the present disclosure relates to a control method for a semiconductor device including a first arithmetic part and a second arithmetic part, wherein the first arithmetic part includes a first arithmetic unit that performs an operation, a first memory that stores data for use at the first arithmetic unit, a first data transfer control unit that controls transfer of data between the first memory and a second memory of the second arithmetic part, and a second data transfer control unit that controls transfer of data between the first memory and an external memory, and the second arithmetic part includes a plurality of second arithmetic units that perform operations, wherein the second memory stores data for use at the plurality of second arithmetic units, and the second arithmetic part communicates with an external memory via the first arithmetic part, comprising: transferring, by the first data transfer control unit, a parameter error calculated by the second arithmetic units from the second memory to the first memory, the parameter error being an error of a parameter for use in a layer of a neural network; transferring, by the second data transfer control unit, the parameter from the external memory to the first memory; and using, by the first arithmetic unit, the parameter and the parameter error stored in the first memory to calculate the updated value of the parameter.

BRIEF DESCRIPTION OF THE DRAWINGS

Other objects and further features of the present disclosure will be apparent from the following detailed description when read in conjunction with the accompanying drawings, in which:

FIG. 5 is an explanatory diagram for illustrating an exemplary layer algorithm in the forward and backward operations according to one embodiment of the present disclosure;

FIG. 6 is an explanatory diagram for illustrating an exemplary gradient descent method to optimize parameters according to one embodiment of the present disclosure;

FIG. 16 is a flowchart for illustrating an exemplary operation of the semiconductor device in FIG. 15 to update parameters according to one embodiment of the present disclosure.

DETAILED DESCRIPTION

Embodiments of the present disclosure are described in detail below with reference to the drawings.

Figure 1:
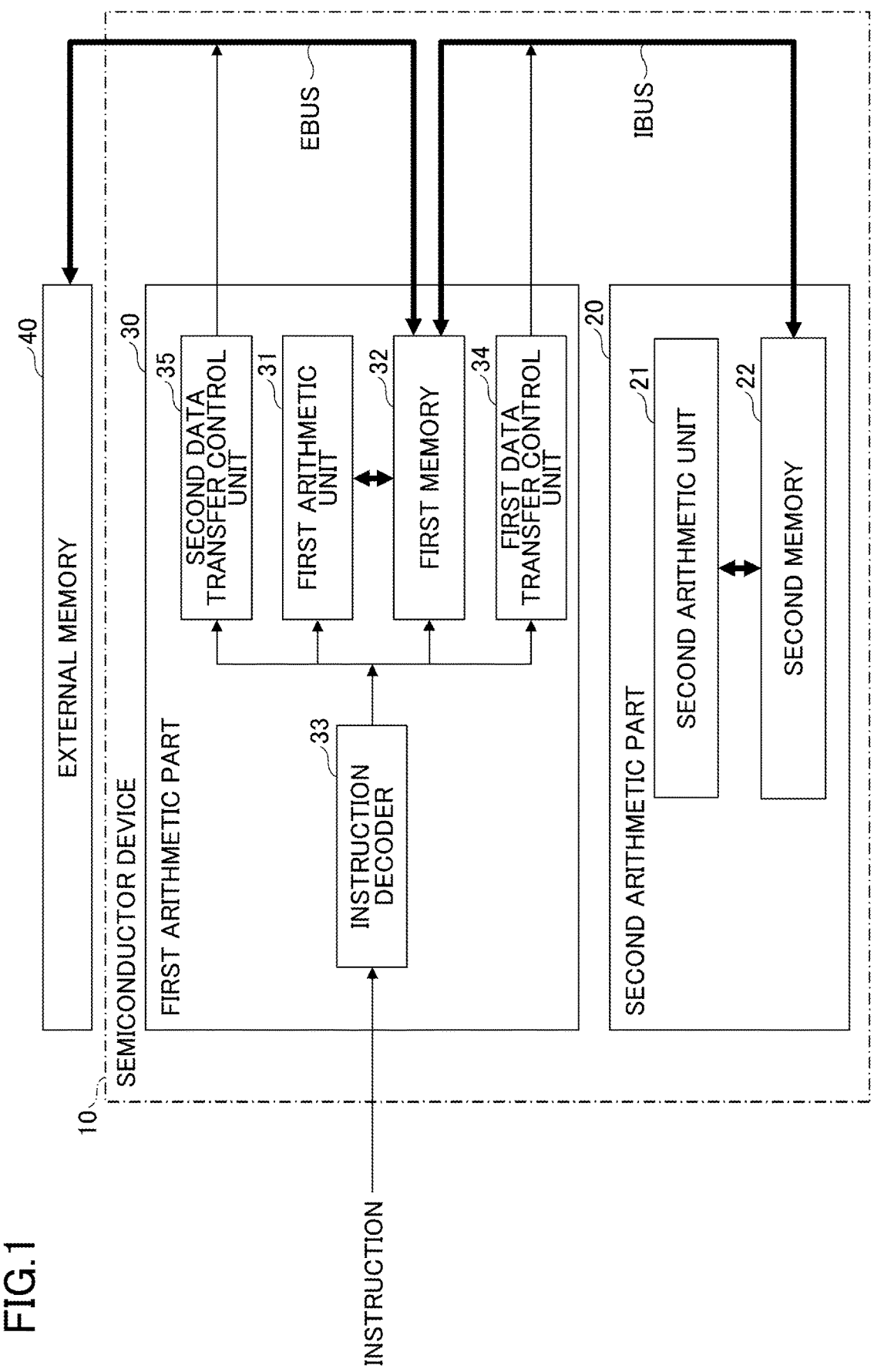
FIG. 1 is a block diagram for illustrating an exemplary semiconductor device according to one embodiment of the present disclosure.

FIG. 1 is a block diagram for illustrating an exemplary semiconductor device according to one embodiment of the present disclosure. A semiconductor device 10 shown in FIG. 1, which is a processor for use in training a deep neural network (DNN) including a plurality of layers, for example, performs a forward operation, a backward operation and a parameter updating operation. The forward operation, the backward operation and the parameter updating operation are described below in connection with FIGS. 3 and 4.

The semiconductor device 10 includes a first arithmetic part 30 and a second arithmetic part 20. The first arithmetic part 30 includes a first arithmetic unit 31, a first memory 32, an instruction decoder 33, a first data transfer control unit 34 and a second data transfer control unit 35. The second arithmetic part 20 includes a second arithmetic unit 21 and a second memory 22. In the present embodiment, the first arithmetic part 30 is an optimization operation unit that performs the parameter updating operation, and the second arithmetic part 20 is a vector arithmetic unit that performs the forward and backward operations of the deep neural network. The first arithmetic part 30 is one example of a first integrated circuit, and the second arithmetic part 20 is one example of a second integrated circuit.

The second arithmetic unit 21 includes a large number of arithmetic units for performing vector operations, matrix operations or the like. The second arithmetic part 20 may include an instruction buffer for storing instructions such as an arithmetic instruction and a data transfer instruction, an instruction decoder for decoding the instructions, a register for storing data and operation results, and others. Also, the second arithmetic part 20 may have an instruction memory, an instruction cache or a data cache as well as the second memory 22.

Various types of arithmetic units included in the second arithmetic unit 21 may include, but are not limited to, a product sum arithmetic unit, a multiplier, an adder, a divider or the like. Also, the second arithmetic unit 21 according to the present embodiment may include a floating point arithmetic unit and a fixed point arithmetic unit, and the floating point data may be of any of half-precision, single precision or double precision, for example.

The second memory 22 has a plurality of storage areas identified by addresses and stores data, parameters or the like for use in operations at the second arithmetic unit 21. For example, the second memory 22 is a high-speed SRAM. However, the second memory 22 may be an eDRAM (embedded DRAM), a MRAM (Magnetoresistive Random Access Memory), a PCM (Phase-change Memory), a ReRAM (Resistive Random Access Memory) or the like.

The first arithmetic unit 31 of the first arithmetic part 30 includes an adder, a multiplier, a divider, a logical arithmetic unit (an OR logic, an AND logic, a NOT logic and an EXOR logic) and a square root arithmetic unit, for example. The square root arithmetic unit may be a type of arithmetic unit to determine an approximate value with reference to a lookup table. If the first arithmetic unit 31 has an arithmetic unit for calculating other types of functions such as a logarithmic arithmetic unit, these arithmetic units may also be types of arithmetic units to determine an approximate value with reference to a lookup table. Also, the first arithmetic unit 31 may have an inverse square root arithmetic unit instead of the square root arithmetic unit.

In addition, in the case where the first arithmetic unit 31 executes the parameter updating operation in training a deep neural network, the first arithmetic unit 31 may have an arithmetic unit dedicated to calculate values for a formula for determining updated values of parameters or values for predetermined terms in the formula. For example, if the updated values Wt of the parameters are determined in accordance with ADAM (Adaptive Moment Estimation) in FIG. 6, an arithmetic unit dedicated to calculate the second term in the right-hand side of the formula may be provided in the first arithmetic unit 31. Accordingly, the operation efficiency can be improved.

For example, various types of arithmetic units included in the first arithmetic unit 31 are floating point arithmetic units, and the types of floating point numbers to be handled are any one or more of half-precision, single precision and double precision. The various arithmetic units included in the first arithmetic unit 31 may be SIMD (Single Instruction Multiple Data) arithmetic units. For example, a double precision SIMD arithmetic unit can perform operations on two single precision data or four half-precision data in parallel. Note that the register for storing data executed by the SIMD arithmetic unit may be of a fixed length or a variable length in which the size may vary based on information included in the instruction. The first arithmetic unit 31 may include an arithmetic unit for calculating fixed point data. In addition, the first arithmetic unit 31 may include an arithmetic unit for converting the type of floating point data, an arithmetic unit for converting floating point numbers into fixed point numbers or an arithmetic unit for converting fixed point numbers into floating point numbers.

The first arithmetic unit 31 is capable of performing an operation of a logarithmic function and an operation of an exponential function by combining a bit operation, a floating point operation, an integer operation and others. The operation of the logarithmic function or the exponential function may be performed by combining a plurality of arithmetic instructions or may be performed by a dedicated arithmetic unit having a combination of a plurality of arithmetic units.

Each arithmetic unit included in the first arithmetic unit 31 reads out data stored in the first memory 32 to execute an operation and stores an operation result in the first memory 32 based on a control signal from the instruction decoder 33. Hereinafter, each arithmetic unit included in the first arithmetic unit 31 may be also referred to as the first arithmetic unit 31. Also, the first arithmetic unit 31 may include an optimal number of arithmetic units for each type of arithmetic unit to perform the parameter updating operation. As a result, in the first arithmetic part 30, a B/F ratio, which is the ratio of the band of the external memory 40 to the operation performance at execution of the parameter updating operation, can be set to an optimal value.

The first memory 32 has a plurality of storage areas identified by addresses. The first memory 32 is coupled to the second memory 22 of the second arithmetic part 20 through the first bus IBUS for coupling the first arithmetic part 30 to the second arithmetic part 20 and is coupled to the external memory 40 through the second bus EBUS. In this embodiment, the first bus IBUS and the second bus EBUS are independent of each other. Therefore, data is transferred from the external memory 40 to the second memory 22 via the first memory 32. However, as described later, a bypass switch for interconnecting the first bus IBUS to the second bus EBUS may be provided in the first memory 32, so that a penalty of access delay caused by passing through the first memory 32 can be reduced. Although the first memory 32 is composed of a high speed SRAM, the first memory 32 may be composed of an eDRAM, an MRAM, a PCM, a ReRAM or the like.

The instruction decoder 33 may decode an instruction supplied from the outside of the semiconductor device 10 and feed a control signal generated based on a decoding result to one or more of the first arithmetic unit 31, the first memory 32, the first data transfer control unit 34 and the second data transfer control unit 35, for example. If the instruction decoder 33 decodes an operation instruction for causing the first arithmetic unit 31 to execute an operation, the instruction decoder 33 feeds information indicating which arithmetic unit in the first arithmetic unit 31 is caused to perform the operation and information indicating the type of the operation instruction to the first arithmetic unit 31. Also, the instruction decoder 33 feeds read information (a read address or the like) for reading data for use in the operation from the first memory 32 and write information (a write address or the like) for writing the operation result to the first memory 32 to the first memory 32 based on decoding of the operation instruction. Hereinafter, the control signal or the like fed from the instruction decoder 33 to the first arithmetic unit 31 may be also referred to as an instruction.

In the first arithmetic unit 31, the arithmetic unit corresponding to the instruction from the instruction decoder 33 performs an operation on data loaded from the first memory 32 and stores the operation result in the first memory 32. The first memory 32 reads out data for use in the operation at the first arithmetic unit 31 from a storage area and feeds the data to the first arithmetic unit 31 to write the received operation result to a storage area based on information such as an address from the instruction decoder 33.

Note that instructions supplied to the instruction decoder 33 may be an instruction for executing one operation, a SIMD instruction for executing a plurality of operations or an instruction for executing an operation at a specified number of times. Upon receiving an instruction a specified number of times, the first arithmetic unit 31 may perform the operation the specified number of times while changing the loading sources of data in the first memory 32 and the storage destinations of the operation results in turn. By including the SIMD instruction or the instruction specifying the number of operations in an instruction set, the efficiency of supplying the instruction to the first arithmetic part 30 can be improved.

In the case where the instruction decoder 33 decodes a data transfer instruction for transferring data between the second memory 22 and the first memory 32, the instruction decoder 33 may feed a source address, a destination address, transfer amount information and input/output information to the first data transfer control unit 34, for example. Also, in the case where the instruction decoder 33 decodes a data transfer instruction for transferring data between the external memory 40 and the first memory 32, the instruction decoder 33 may feed a source address, a destination address, transfer amount information and input/output information to the second data transfer control unit 35. The source address indicates the data transfer source, the destination address indicates the data transfer destination, the transfer amount information indicates the amount of transferred data such as the number of transferred bytes, and the input/output information indicates the input/output direction (read/write) of the data.

The first data transfer control unit 34 accesses the second memory 22 and the first memory 32 through the first bus IBUS based on the source address, the destination address, the transfer amount information and the input/output information received from the instruction decoder 33. For example, if the data transfer instruction indicates the data transfer from the second memory 22 to the first memory 32, the first data transfer control unit 34 issues the number of read commands corresponding to the amount of transferred data to the second memory 22. Also, the first data transfer control unit 34 issues the number of write commands corresponding to the amount of transferred data to the first memory 32. Then, the amount of data corresponding to the transfer amount information is transferred from the second memory 22 to the first memory 32.

The second data transfer control unit 35 accesses the external memory 40 and the first memory 32 through the second bus EBUS based on the source address, the destination address, the transfer amount information and the input/output information received from the instruction decoder 33. For example, if a data transfer instruction indicates the data transfer from the first memory 32 to the external memory 40, the second data transfer control unit 35 issues the number of read commands corresponding to the amount of transferred data to the first memory 32. Also, the second data transfer control unit 35 issues the number of writing commands corresponding to the amount of transferred data to the external memory 40. Then, the amount of data corresponding to the transfer amount information is transferred from the first memory 32 to the external memory 40.

The first data transfer control unit 34 may issue a data transfer request in the form of a packet to the second memory 22 and the first memory 32 based on the data transfer instruction from the instruction decoder 33. Similarly, the second data transfer control unit 35 may issue a data transfer request in the form of a packet to the first memory 32 and the external memory 40 based on the data transfer instruction from the instruction decoder 33.

For example, the external memory 40 may be a main storage device such as a SDRAM memory module. The external memory 40 may be a multilayer type of memory module such as an HBM (High Bandwidth Memory) or an HMC (Hybrid Memory Cube).

For example, the semiconductor device 10 preferably has a single chip form. Inclusion of the second arithmetic part 20 and the first arithmetic part 30 in one chip can form the first bus IBUS as wirings inside the chip. Further, the fast accessibility of the second memory 22 and the first memory 32 can be used to quickly transfer data between the second memory 22 and the first memory 32.

On the other hand, the second arithmetic part 20 and the first arithmetic part 30 may be provided in separate semiconductor chips. In this case, a semiconductor device including the second arithmetic part 20 and a semiconductor device including the first arithmetic part 30 are separately designed. This allows the chip sizes of the respective semiconductor chips to be smaller than the chip size of a single semiconductor chip, thereby improving the yield of the semiconductor chips. In this case, it is preferable that an input/output buffer connected to each signal line of the first bus IBUS, an external terminal such as a pad or a bump and a protective element and so on are disposed on both chips.

The first arithmetic part 30 may include an instruction buffer for storing instructions supplied to the instruction decoder 33, a program counter, a register for storing data or operation results for use in operations or the like. For example, storage of a plurality of instructions in the instruction buffer in parallel can improve the supply efficiency of the instructions to the first calculation unit 30. The instructions stored by the instruction buffer may be transferred from the external memory 40 and may be transferred from the external memory 40 to the instruction buffer based on instructions from the CPU 210 as described in connection with FIG. 2.

Further, provision of a program counter to the first arithmetic part 30 can add a conditional branch instruction to an instruction set, and the added conditional branch instruction allows a loop operation to be implemented. As a result, the supply efficiency of instructions can be improved. Also, by changing functions performed depending on branch destinations of the conditional branch instruction, values of complicated functions can be obtained by approximation. Also, conditional execution may be performed with reference to conditional bits.

Further, the first arithmetic part 30 may have a data address register. In this case, indirect reference to addresses can be achieved, and different operations can be performed by changing the register value without changing an application program. Further, by rewriting the data address register according to operation results, for example, it is possible to change reference destinations of a lookup table for use in approximation of operations, and approximation can be made by segmenting data into a plurality of sections and using different functions for the respective sections.

Figure 2:
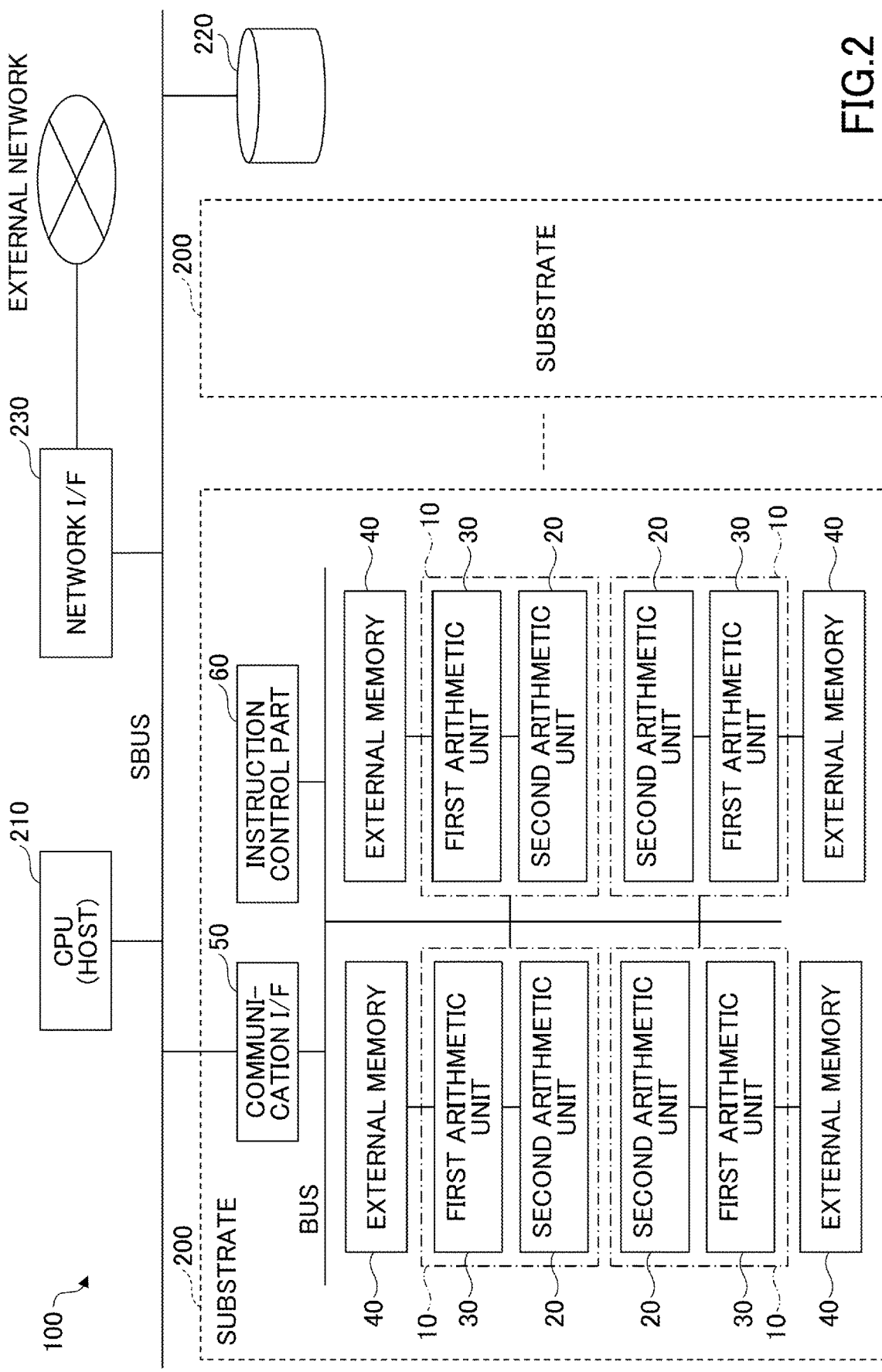
FIG. 2 is a block diagram for illustrating an exemplary information processing apparatus including the semiconductor device in FIG. 1 according to one embodiment of the present disclosure.

FIG. 2 is a block diagram for illustrating an exemplary information processing apparatus including the semiconductor device 10 in FIG. 1. The information processing apparatus 100 as shown in FIG. 2 includes a predetermined number of boards 200, a CPU 210, an external storage device 220 and a network interface (I/F) 230, which are interconnected via a system bus SBUS. For example, the predetermined number of boards 200 and the CPU 210 may be mounted on a system board. The information processing apparatus 100 according to the present disclosure may be of various forms. For example, a main storage device accessed by the CPU 210 may be coupled to the system bus SBUS, and a GPU may be coupled to the system bus SBUS.

The system bus SBUS may be a PCIe (Peripheral Component Interconnect express) bus, for example. The information processing apparatus 100 may also serve as a server for training a deep neural network in cooperation with a plurality of semiconductor devices 10.

Each of the substrates 200 includes a plurality of semiconductor devices 10, a plurality of external memories 40 coupled to the plurality of semiconductor devices 10, a communication interface 50 and an instruction control unit 60. The instruction control unit 60 may be provided to each of the plurality of semiconductor devices 10. Also, the number of semiconductor devices 10 mounted on the substrate 200 is not limited to four. The plurality of semiconductor devices 10, the communication interface 50 and the instruction control unit 60 are interconnected via a bus BUS provided on the substrate 200. Note that the substrate 200 may be in the form of a bare substrate coupled to a connector provided on the system substrate or in the form of a package soldered to the system substrate.

The CPU 210 manages the overall operations of the information processing apparatus 100 and may serve as a host computer that assigns data for use in operations for deep learning to each of the plurality of semiconductor devices, for example. Also, the external storage device 220 may store data and parameters for use in deep learning operations performed by each semiconductor device 10. Also, the external storage device 220 may store management programs and application programs for execution of the CPU 210 and instructions for execution of the semiconductor devices 10. The external storage device 220 may be a hard disk, a SSD (Solid State Drive) or other storage device. The network interface 230 couples the system bus SBUS to an external network. Information such as programs and data stored in the external storage device 220 may be transferred from the external network via the network interface 230.

In each of the substrates 200, the communication interface 50 controls communications between the CPU 210 and the communication interfaces 50 of other substrates 200 or the network interface 230 via the system bus SBUS. The instruction control unit 60 controls instructions issued to the respective semiconductor devices 10 coupled via the bus BUS based on instructions from the CPU 210. Namely, the instruction control unit 60 issues various instructions to the respective semiconductor devices 10 to cause the semiconductor devices 10 to perform training based on instructions fed from the CPU 210 in accordance with a predetermined training procedure for deep neural networks. The instructions issued from the instruction control unit 60 are supplied to the instruction decoder 33 in the semiconductor device 10 as shown in FIG. 1.

The instruction control unit 60 may feed a timing signal for synchronizing operations of the second arithmetic part 20 with operations of the first arithmetic part 30 to one or both of the second arithmetic part 20 and the first arithmetic part 30. Note that if the CPU 210 can manage instructions issued to the respective semiconductor devices 10, the instructions may be issued directly from the CPU 210 to the respective semiconductor devices 10. In this case, the instruction control unit 60 may not be mounted to the substrate 200.

For example, the plurality of semiconductor devices 10 may be mounted to the substrate 200 in the form of a semiconductor module (package). For example, in FIG. 2, four semiconductor devices 10 are included in a single semiconductor module. Further, if the first arithmetic part 30 and the second arithmetic part 20 are designed as separate semiconductor devices (chips), a semiconductor module having a plurality of semiconductor devices including the first arithmetic part 30 may be mounted on the substrate 200. Additionally, for example, the information processing apparatus 100 may form a cluster of a plurality of semiconductor devices 10 coupled via a network.

Figure 3:
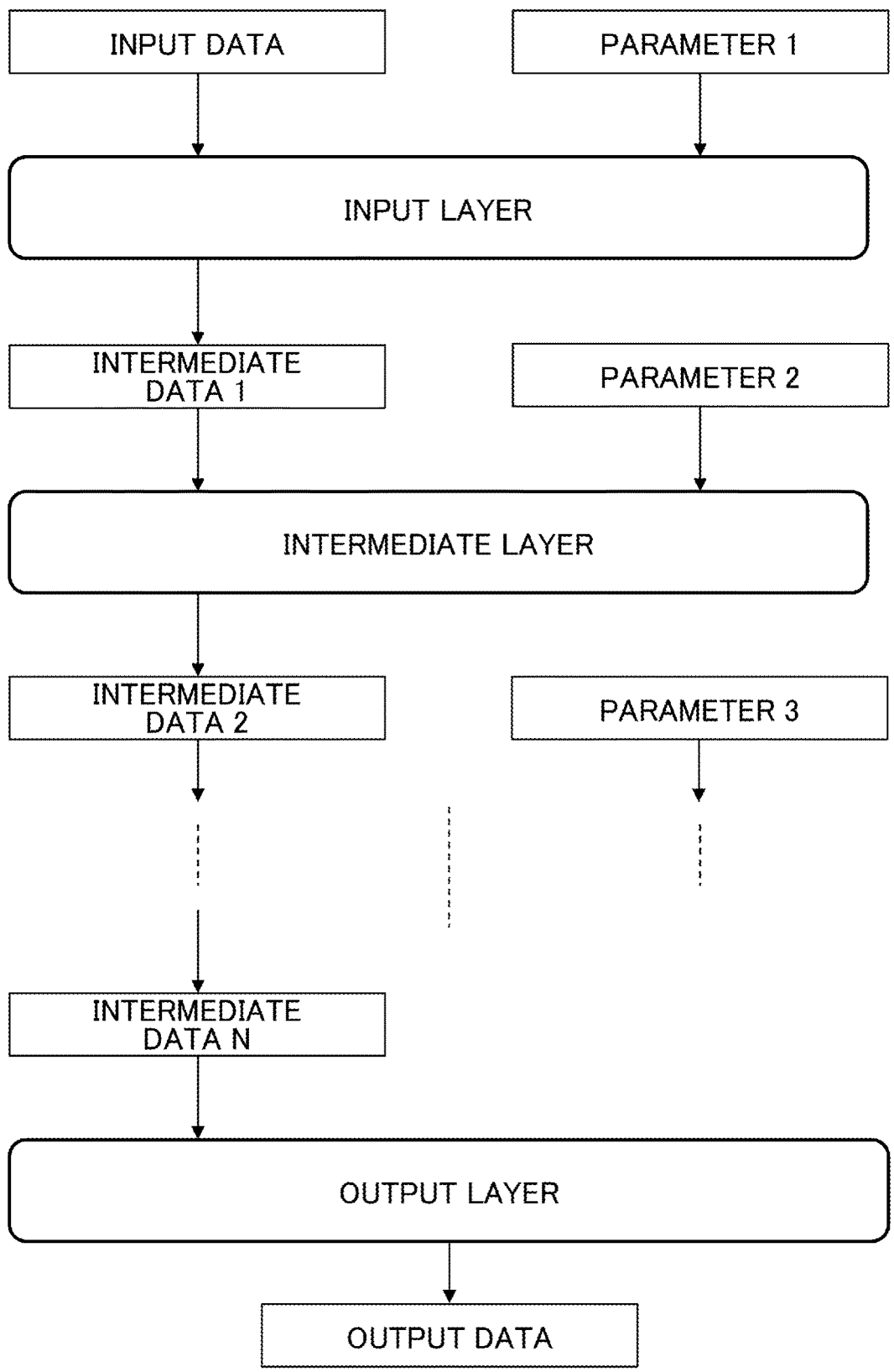
FIG. 3 is a flowchart for illustrating an exemplary forward operation in training a deep neural network according to one embodiment of the present disclosure.

FIG. 3 is a flowchart for illustrating an exemplary forward operation in training a deep neural network. In the forward operation, data and parameters such as weights are fed into each of an input layer and a predetermined number of intermediate layers. In the input layer, an operation is performed on input data and parameter 1 to generate intermediate data 1. In the intermediate layer next to the input layer, an operation is performed on the intermediate data 1 and parameter 2 to generate intermediate data 2. Also in the subsequent intermediate layers, operations are performed on the intermediate data generated by the previous intermediate layers and the parameters configured for the respective intermediate layers, and the resulting intermediate data is fed into the next intermediate layers. Note that there may be intermediate layers that do not use parameters. The intermediate layers may include, for example, a convolution layer, a pooling layer, and a fully-connected layer.

In the output layer, intermediate data N generated at the intermediate layer N (the N-th layer) disposed immediately before the output layer is used to determine output data. In the output layer for determining errors in classification problems, for example, output data (solution) is obtained by using a softmax function as an activation function and a cross entropy as an error function. In the output layer, as illustrated in FIG. 4, an error between the output data and the teaching data (true data) is obtained through comparison between the output data and the teaching data.

In this manner, in each layer of the neural network, the input data and parameters are calculated to determine data to be delivered to the next layer, and the output data is provided from the last layer (forward propagation). Note that the forward operation may be used not only for training the neural network but also for inference using the neural network.

Figure 4:
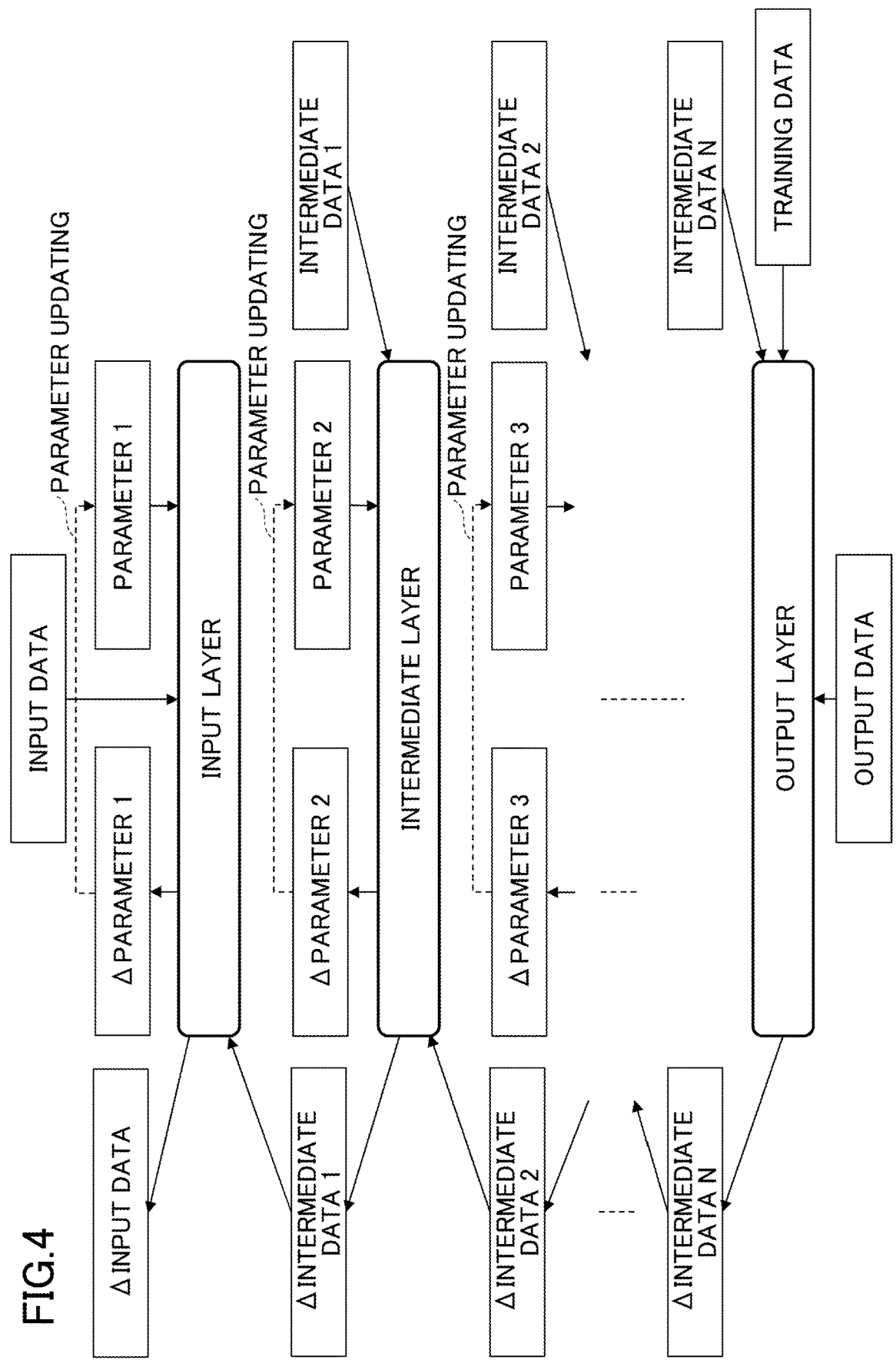
FIG. 4 is a flowchart for illustrating an exemplary backward operation and an exemplary parameter updating operation in training a deep neural network according to one embodiment of the present disclosure.

FIG. 4 is a flowchart for illustrating an exemplary backward operation and an exemplary parameter updating operation in training a deep neural network. In the backward operation, back propagation, where errors are propagated in the reverse direction to the forward operation, is performed. In FIG. 4, the symbol $\Delta$ denotes an error of data or an error of a parameter. The parameter updating operation is indicated by dashed arrows.

First, in the backward operation, the output data generated in the forward operation is compared with the teaching data in the layer (output layer) for determining the error, and $\Delta$ intermediate data N, which denotes an error for the intermediate data N fed into the output layer, is generated. The $\Delta$ intermediate data N may be also an error for the output data fed from the N-th intermediate layer.

Next, in the respective intermediate layers, the error ($\Delta$ intermediate data) for the output data and intermediate data as the input data are calculated in the order starting from the intermediate layers closer to the output layer, and $\Delta$ parameters as errors for the parameters of the intermediate layers are generated. The $\Delta$ parameter denotes the gradient of the parameter on the curve showing the change in the error relative to the change in the parameter. For example, in the intermediate layer 2, the intermediate data 2 and the intermediate data 1 are calculated to determine $\Delta$ parameter 2.

Also in the respective intermediate layers, errors ($\Delta$ intermediate data) for the output data and parameters of the intermediate layers are calculated to generate $\Delta$ intermediate data indicative of errors for the input data of the intermediate layers. The error ($\Delta$ intermediate data) for the input data of the intermediate layers may be also an error for the output data from the previous intermediate layer (or an input layer). For example, in the intermediate layer 2, $\Delta$ intermediate data 2 and the parameter 2 are calculated to determine $\Delta$ intermediate data 1.

Also in the input layer, similar to the intermediate layers, the $\Delta$ intermediate data 1 and the input data are calculated to determine $\Delta$ parameter 1, and the $\Delta$ intermediate data 1 and the parameter 1 are calculated to determine $\Delta$ input data as an error for the input data.

In the parameter updating operation, the $\Delta$ parameter (error gradient) determined in the backward operation is used at the respective intermediate layers and the input layer to correct the parameters. Namely, the parameters are optimized. The parameters may be optimized in accordance with a gradient descent method such as Momentum-SGD (Stochastic Gradient Descent) and ADAM.

In this manner, in the backward operation, the error of the data fed from the output data and the teaching data into the output layer (the output data of the previous intermediate layer of the output layer) is calculated. Then, the calculation of the error of the input data by using the calculated error of the data and the calculation of the error of the parameter by using the error of the input data are performed in the order starting from the output side layers (back propagation). In the parameter updating operation, parameters are optimized based on the errors of parameters obtained in the backward operation.

FIG. 5 is an explanatory diagram for illustrating an exemplary layer algorithm in the forward operation and the backward operation. FIG. illustrates an exemplary fully-connected layer for the basic layer algorithm in a neural network. Hereinafter, an exemplary operation of image data is described, but the layer algorithm shown in FIG. 5 can be applied to the operation of other types of data than the image data.

For simplicity of explanation, it is assumed that the batch size processed at one operation of the layer algorithm is the same as the image size and that the layer algorithm shown in FIG. 5 is performed for each image. On the other hand, if divisional images resulting from division of an image is used as the batch size, the number of nests of loops may be increased compared to the example as illustrated in FIG. 5. Note that a convolution layer, which is frequently used in image processing, can be considered as a fully-connected layer having a large number of elements, if the convolution structure is ignored.

In the forward operation, the symbol N denotes the order of the layers (layer number) and indicates that the larger the layer number, the closer the layer is located toward the output side. The symbol $D_{N+1}$ indicates output data fed from the layer, the symbol $D_N$ indicates input data fed into that layer, and the symbol $W_N$ indicates parameters fed into the layer. The symbol B denotes the number of elements of data (the number of to-be-processed pixels), the symbol $O_C$ denotes the number of output channels (i.e., the number of units included in the layer), and the symbol $I_C$ denotes the number of input channels (i.e., the number of units included in the previous layer). In the forward operation, as described with reference to FIG. 3, the output data $D_{N+1}$ (intermediate data) is calculated for each of the output channels in the input layer and the intermediate layers while changing the input data $D_N$ and the parameters $W_N$.

In the backward operation, the symbol $\Delta D_{N+1}$ denotes an error of data received from the layer of the output side, and the symbol $\Delta D_N$ denotes an error of data fed into the layer of the input side. Here, the output side indicates the side on which data is output in the forward operation, and the input side indicates the side on which data is input in the forward operation. The symbol $\Delta W_N$ denotes an error of the parameters, and the symbol $W_N$ denotes the parameters. Other symbols are the same as those for the forward operation.

In the backward operation, as described with reference to FIG. 4, the input error $\Delta D_N$ ($\Delta$ intermediate data or $\Delta$ input data) is calculated for each of the output channels while changing the output error $\Delta D_{N+1}$ and the parameter $W_N$. Further, the parameter error $\Delta W_N$ ($\Delta$ parameter) is calculated for each of the output channels while changing the output error $\Delta D_{N+1}$ and the input data $D_N$.

Here, in the case where the training of the neural network such as the forward operation and the backward operation is performed at a plurality of computing nodes (for example, a pair of the semiconductor device 10 and the external memory 40) in parallel, the computing nodes may be assigned in the following three manners.

Assignment 1: Data is assigned to the computing nodes for each image or for each divisional image resulting from division of the image. In other words, the computing nodes are assigned to respective elements of the image (batch/image division).

Assignment 2: Data is divided in the channel direction (units of each layer), and the divided data pieces are assigned to the computing nodes (channel division).

Assignment 3: Data is assigned to the computing nodes for each layer (layer division).

In the channel division, data to be input/output per layer need to be communicated in an all-to-all manner, which may lead to a communication bottleneck. In the layer division, data to be input and output between layers need to be moved between the computing nodes, which may lead to a communication bottleneck, and management of the moved data may be complicated. In the batch/image division, data regarding parameters need to be reduced or broadcast among the computing nodes. However, in architectures of most neural networks, the size of the parameters for use in operations is smaller than the size of data such as input data for use in the operations, so that the communication bottleneck may rarely arise. Accordingly, in order to reduce the amount of communication between the computing nodes, it may be more efficient to train the neural networks in accordance with the batch/image division (Assignment 1) such that a larger size of data is assigned per element to the computing nodes.

The band of the external memory 40 needs to be designed in consideration of a relatively large size of data. For example, in training neural networks in accordance with the batch/image division, data to be input and output between layers may vary for different arithmetic units for execution of operations, so that when the data is placed into the external memory 40, the band needs to be widened.

On the other hand, in training neural networks in accordance with the batch/image division, if only parameters of relatively small sizes are exchanged with the external memory 40, the band of the external memory 40 may not be exhausted. For example, the parameters may be broadcast from the external memory 40 to the respective arithmetic units with the same value, and parameter errors may be reduced and stored in the external memory 40. The broadcasting and reduction are paired communications. Accordingly, the input/output direction of data is opposite, but the order of the band may not be changed. The parameter updating operation for optimizing the parameters can be performed at a smaller number of arithmetic operations than operations of the layer algorithm such as a convolution operation. Accordingly, if the second arithmetic part 20 including a large number of arithmetic units performs the parameter updating operation, the utilization efficiency of the arithmetic units may be reduced. According to this embodiment, these problems can be solved.

Also, in the training of neural networks, communications for reduction and broadcasting are performed on a large number of arithmetic units. The band of this type of communication may be limited to the width of communication paths near the respective arithmetic units, in which case the band of the external memory 40 may not be exhausted. For example, if an operation is performed at the second arithmetic part 20, communications for reduction and broadcasting of the parameters are required to calculate the layer algorithm, and there are cases where the band of the external memory 40 may not be exhausted at timings of calculating the layer algorithm. On the other hand, according to the present embodiment, the parameter updating operation may be additionally performed at the first arithmetic part 30 in parallel to the calculation of the layer algorithm at the second arithmetic part 20, which may allow the band of the external memory to be efficiently utilized.

FIG. 6 is an explanatory diagram for illustrating an exemplary gradient descent method for optimizing parameters. In FIG. 6, parameters with the symbol t−1 denote pre-updated parameters, and parameters with the symbol t denote post-updated parameters. The symbol $\Delta W_t$ denotes the gradient of an error of the parameters immediately before updating.

In the Momentum-SGD, two multiplications and two additions and subtractions are performed to calculate the new parameter $W_t$ from the parameter error $\Delta W_t$. In the ADAM, in order to calculate the new parameter $W_t$ from the parameter error $\Delta W_t$, six multiplications, six additions and subtractions, one square root operation and one division are performed. On the other hand, in the calculation of the layer algorithm shown in FIG. 5, a number of product sum calculations proportional to the product of the parameter size and the data size are performed. In this manner, the number of operations performed to update the parameters is less than the number of operations performed in the layer algorithm such as a convolution operation. Therefore, if only the parameter updating operation is executed at the arithmetic unit, the B/F ratio, which is the ratio of the band of the memory per operation performance, becomes high, and if a vector arithmetic part or the like having a large number of arithmetic units is used, most of the arithmetic units may be unused.

Figure 7:
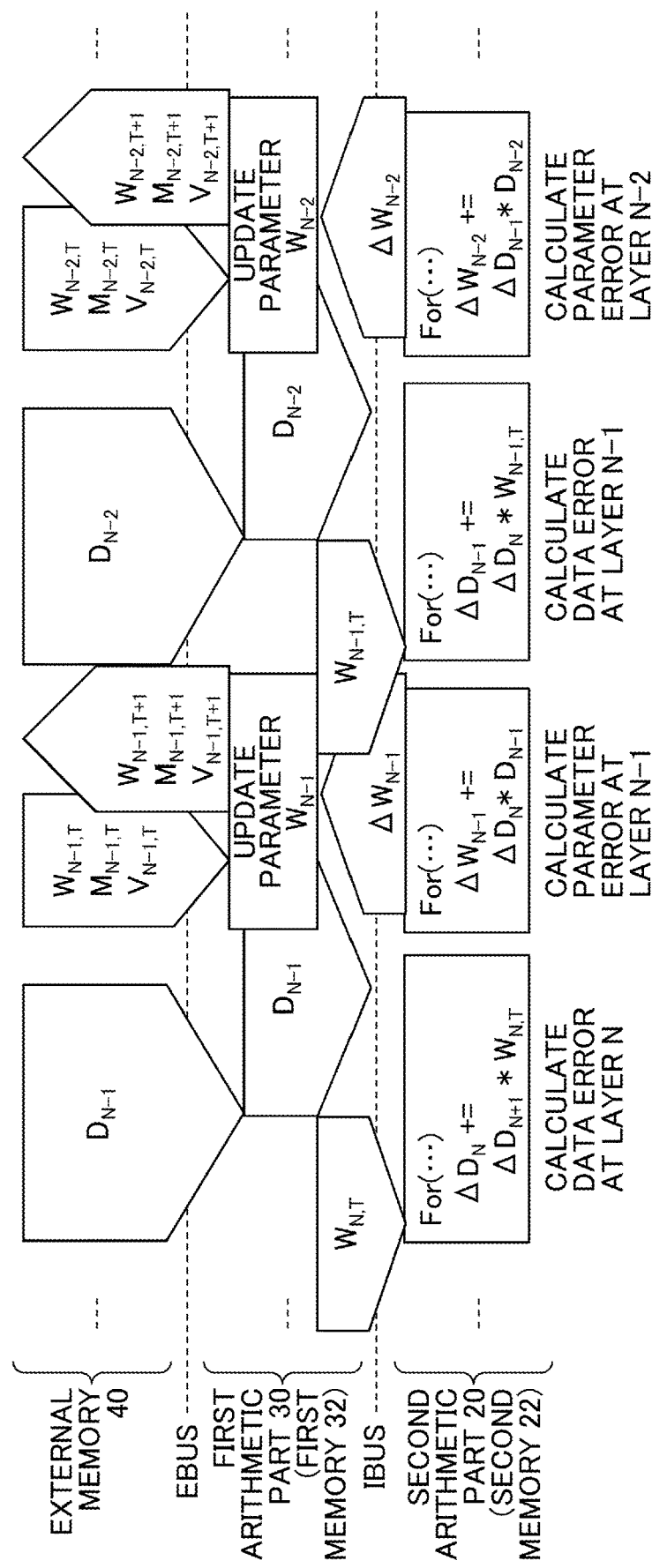
FIG. 7 is a sequence diagram for illustrating an exemplary case where the backward operation and the parameter updating operation are performed by the semiconductor device in FIG. 1 according to one embodiment of the present disclosure.

FIG. 7 is a sequence diagram for illustrating an exemplary execution of the backward operation and the parameter updating operation at the semiconductor device 10 of FIG. 1. Namely, FIG. 7 illustrates an exemplary control method for the semiconductor device 10. FIG. 7 illustrates an example where the back propagation on a deep neural network at the second arithmetic part 20 is performed in parallel to the parameter updating operation at the first arithmetic part 30. In FIG. 7, an operation of the layer N-1, a portion of an operation of the layer N immediately after the layer N-1 and a portion of an operation of the layer N-2 immediately before the layer N-1 in the multiple layers in the deep neural network are illustrated.

The symbol T attached to parameters W, M and V indicates that it is before updating, and the symbol T+1 attached to parameters W, M and V indicates that it is after updating. For example, the parameter W may be updated with the parameters M and V in accordance with the ADAM.

A pentagon denotes a data transfer, and a protruding corner denotes a transfer destination. The pentagon does not necessarily mean that data is collectively transferred at once. In other words, the pentagon may indicate that the data is divided and transferred in multiple transmission occasions. If the data transfer is performed across a plurality of times, the first data transfer control unit 34 or the second data transfer control unit 35 issues a data transfer instruction for each data transfer occasion. Hereinafter, the data transfer instruction for transferring data between the external memory 40 and the first memory 32 is referred to as an external data transfer instruction, and the data transfer instruction for transferring data between the first memory 32 and the second memory 22 is referred to as an internal data transfer instruction. In the case where the external data transfer instruction is decoded, the instruction decoder 33 shown in FIG. 1 feeds a control signal to the second data transfer control unit 35, and in the case where the internal data transfer instruction is decoded, feeds a control signal to the first data transfer control unit 34.

Similar to the data transfer, operations of calculating the data error $\Delta D$ and the parameter error $\Delta W$ at the second arithmetic part 20 and operations of calculating the parameter W at the first arithmetic part 30 may be divided into several portions and may be performed across multiple times. In these calculation operations, the second arithmetic unit 21 and first arithmetic unit 31 may perform operations on a plurality of data pieces for one instruction (SIMD method). At this time, the SIMD instruction supplied to the instruction decoder 33 may specify the number of data pieces to be calculated (variable length SIMD method).

The first arithmetic part 30 transmits the parameters $W_{N,T}$ stored in the first memory 32 to the second memory 22 of the second arithmetic part 20 based on reception of the internal data transfer instruction. Therefore, the semiconductor device 10 can transfer the parameters $W_{N,T}$ to the second memory 22 without using the second bus EBUS. The parameters $W_{N,T}$ are parameters of the layer N for use in the forward operation and have been transferred from the external memory 40 to the first memory 32 during the parameter updating operation of the layer N. As illustrated in FIG. 5, the second arithmetic part 20 uses the data error $\Delta D_{N+1}$ and the transferred parameters $W_{N,T}$ to calculate the data error $\Delta D_N$ and stores the calculated data error $\Delta D_N$ in the second memory 22. Note that the data error $\Delta D_{N+1}$ is calculated at the backward operation of the layer N+1 and is stored in the second memory 22.

During the calculation of the data error $\Delta D_N$ of the layer N at the second arithmetic part 20, the first arithmetic part 30 receives an external data transfer instruction, transfers the data $D_{N-1}$ stored in the external memory 40 to the first memory 32 and further transfers the data $D_{N-1}$ from the first memory 32 to the second memory 22. Since the external memory 40 is not accessed during the calculation of the data error $\Delta D_N$, the data $D_{N-1}$ can be transferred to the first memory 32 using a free band of the second bus EBUS.

Next, the second arithmetic part 20 uses the data error $\Delta D_N$ calculated in processing the layer N and the data $D_{N-1}$ transferred from the external memory 40 to calculate the parameter error $\Delta W_{N-1}$ and stores the calculated parameter error $\Delta W_{N-1}$ in the second memory 22. The first arithmetic part 30 sequentially transfers the parameter error $\Delta W_{N-1}$ from the second memory 22 to the first memory 32 based on reception of an internal data transfer instruction. For example, the instruction control unit 60 in FIG. 2 feeds a timing signal to the second arithmetic part 20 so that the timing of calculating the parameter error $\Delta W_{N-1}$ at the second arithmetic part 20 can match the timing of the internal data transfer instruction for transferring the parameter error $\Delta W_{N-1}$ to the first memory 32.

The first arithmetic part 30 transfers the parameters $W_{N-1,T}$, $M_{N-1,T}$ and $V_{N-1,T}$ from the external memory 40 to the first memory 32 based on reception of an external data transfer instruction. Also, the first arithmetic unit 31 of the first arithmetic part 30 updates the parameter $W_{N-1}$ based on an arithmetic instruction decoded by the instruction decoder 33. Namely, the first arithmetic unit 31 performs the operation of the ADAM shown in FIG. 6, calculates the new parameters $W_{N-1,T+1}$, $M_{N-1,T+1}$ and $V_{N-1,T+1}$ and stores them in the first memory 32. The first arithmetic part 30 transfers the updated parameters $W_{N-1,T+1}$, $M_{N-1,T+1}$ and $V_{N-1,T+1}$ stored in the first memory 32 to the external memory 40 based on reception of an external data transfer instruction.

As shown in FIG. 7, the calculation of the parameters $W_{N-1,T+1}$, $M_{N-1,T+1}$ and $V_{N-1,T+1}$ at the first arithmetic part 30 is performed in parallel with the calculation of the parameter error $\Delta W$ at the second arithmetic part 20. Since the parameter error $\Delta W_{N-1}$ is only used to calculate the parameters $W_{N-1,T+1}$, $M_{N-1,T+1}$ and $V_{N-1,T+1}$ of the corresponding layer N-1, the parameter error $\Delta W_{N-1}$ does not need to be placed in the external memory 40.

Next, similar to the calculation of the data error $\Delta D_N$ of the layer N, the second arithmetic unit 21 of the second arithmetic part 20 is used to calculate the data error $\Delta D_{N-1}$ of the layer N-1. The first arithmetic part 30 transfers the parameter $W_{N-1,T}$ for use in the calculation of the data error $\Delta D_{N-1}$ from the first memory 32 to the second memory 22 of the second arithmetic part 20 based on reception of an internal data transfer instruction. Since the parameter $W_{N-1,T}$ is transferred from the external memory 40 to the first memory 32 at the immediately previous parameter updating operation, the parameter $W_{N-1,T}$ does not need to be transferred from the external memory 40 again, and the band of the second bus EBUS does not need to be used.

The second arithmetic unit 21 of the second arithmetic part 20 uses the data error $\Delta D_N$ and the parameter $W_{N-1,T}$ stored in the second memory 22 to calculate the data error $\Delta D_{N-1}$ and stores the calculated data error $\Delta D_{N-1}$ in the second memory 22. Note that the data error $\Delta D_N$ is calculated at the backward operation for the layer N and is stored in the second memory 22. During the calculation of the data error $\Delta D_{N-1}$ of the layer N−1 at the second arithmetic part 20, the first arithmetic part 30 transfers the data $D_{N-2}$ from the external memory 40 to the second memory 22 through the first memory 32 based on an external data transfer instruction.

Next, similar to the calculation of the parameter error $\Delta W_{N-1}$ of the layer N−1, the second arithmetic unit 21 of the second arithmetic part 20 is used to calculate the parameter error $\Delta W_{N-2}$ of the layer N−2. The second arithmetic part 20 uses the data error $\Delta D_{N-1}$ and the data $D_{N-2}$ transferred from the external memory 40 to the second memory 22 to calculate the parameter error $\Delta W_{N-2}$ and stores the calculated parameter error $\Delta W_{N-2}$ in the second memory 22. The first arithmetic part 30 sequentially transfers the parameter error $\Delta W_{N-2}$ from the second memory 22 to the first memory 32 based on reception of an internal data transfer instruction. The first arithmetic part 30 transfers the parameters $W_{N-2,T}$, $M_{N-2,T}$ and $V_{N-2,T}$ from the external memory 40 to the first memory 32 based on reception of an external data transfer instruction. Then, the first arithmetic unit 31 of the first arithmetic part 30 calculates the new parameters $W_{N-2,T+1}$, $M_{N-2,T+1}$, and $V_{N-2,T+1}$ to update the parameters based on an arithmetic instruction. The first arithmetic part 30 transfers the updated parameters $W_{N-2,T+1}$, $M_{N-2,T+1}$, and $V_{N-2,T+1}$ stored in the first memory 32 to the external memory based on reception of an external data transfer instruction.

According to the present embodiment, the parameter updating operation for the parameter W can be performed by the first arithmetic part 30 during the calculation of the parameter error $\Delta W$ at the second arithmetic part 20. Namely, the backward operation and the parameter updating operation for the parameter W can be performed in parallel by the second arithmetic unit 21 and the first arithmetic unit 31 separately. This can reduce the time required for the backward operation and the parameter updating operation as shown in FIG. 4. Also, since the parameter W is updated during the calculation of the parameter error $\Delta W$, the parameter error $\Delta W$ for only use in the parameter updating operation for the parameter W does not need to be placed in the external memory 40. Therefore, the band of the second bus EBUS can be designed without consideration of transfer of the parameter error $\Delta W$. Since unnecessary data transfer using the second bus EBUS can be eliminated, the power consumption of the semiconductor device 10 can be reduced.

Further, as described with reference to FIG. 6, the number of operations performed to update the parameters for use in neural networks is less than the number of operations performed in the forward and backward operations. Accordingly, if the second arithmetic unit 21 of the second arithmetic part 20 executes the parameter updating operation, the B/F ratio increases, and the utilization efficiency of the second arithmetic unit 21 deteriorates. However, if the first arithmetic unit 31 of the first arithmetic part 30 performs the parameter updating operation for the parameter W during the calculation of the parameter error $\Delta W$ at the second arithmetic unit 21, deterioration of the utilization efficiency of the second arithmetic unit 21 can be avoided.

In addition, since the first arithmetic unit 31 can be designed to have a number of arithmetic units corresponding to the number of arithmetic operations of the parameter updating operation, the utilization efficiency of the first arithmetic unit 31 of the first arithmetic part 30 can be optimized during the parameter updating operations. Further, the parameter W is not transferred from the external memory 40 at the calculation of the data error $\Delta D$ at the second calculation unit 20, and accordingly the band of the second bus EBUS can be designed without consideration of the amount of the parameter W.

Figure 8:
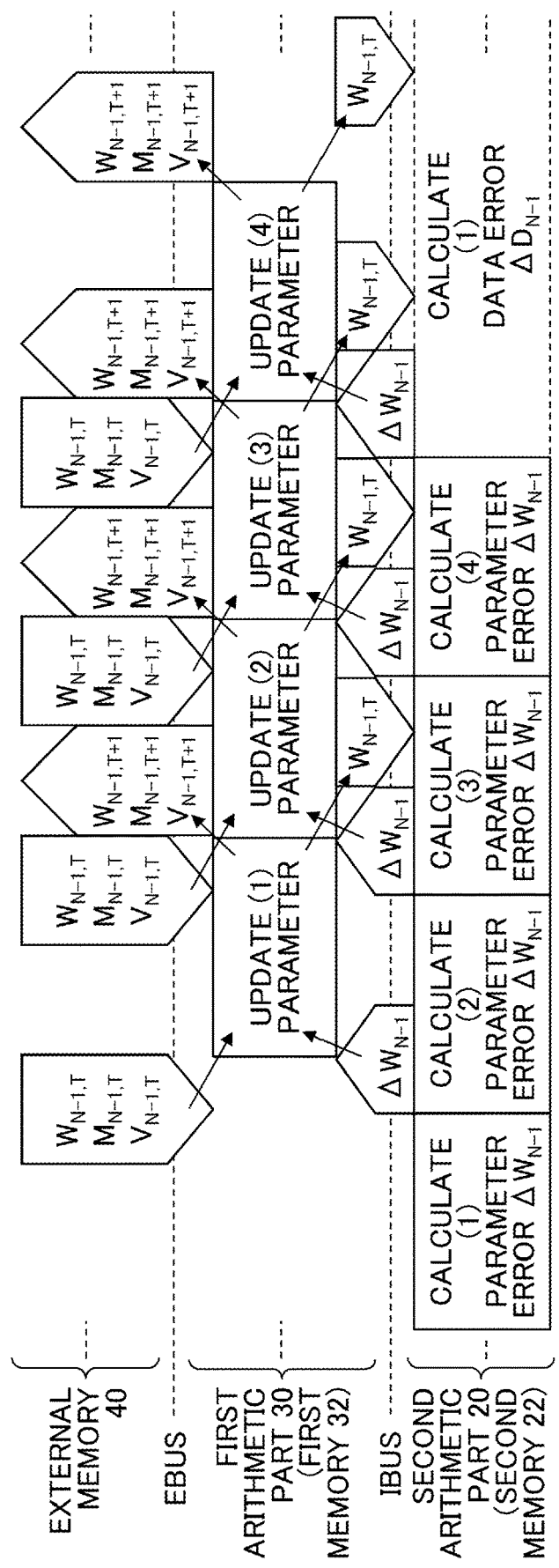
FIG. 8 is an explanatory diagram for illustrating details of calculation for a parameter error at layer N–1 in FIG. 7 and the parameter updating operation according to one embodiment of the present disclosure.

Although it seems that the parameter updating operation, associated transfer of the parameters and calculation of the parameter error $\Delta W$ may be collectively performed in FIG. 7, these operations may be actually divided into a plurality of operations or sub-operations for execution, as shown in FIG. 8.

FIG. 8 is an explanatory diagram for illustrating details of the calculation of the parameter error $\Delta W_{N-1}$ of the layer N−1 and the parameter updating operation of the parameters $W_{N-1}$, $M_{N-1}$ and $V_{N-1}$ in FIG. 7. The calculation of the parameter error $\Delta W_{N-1}$ and the parameter updating operation of the parameters $W_{N-1}$, $M_{N-1}$ and $V_{N-1}$ can be divided into an arbitrary number of portions for parallel execution. For example, FIG. 8 illustrates an exemplary execution of four portions divided from the operations or four of 100 portions divided from the whole operations. Hereinafter, the embodiment where the whole operations are divided into four portions for parallel execution is described.

In the operations (1), the second arithmetic part 20 first uses the data error $\Delta D_N$ (¼) stored in the second memory 22 and the data $D_{N-1}$ (¼) transferred to the second memory 22 to calculate the parameter error $\Delta W_{N-1}$ (¼). The second arithmetic part 20 stores the calculated parameter error $\Delta W_{N-1}$ in the second memory 22.

In the operations (1), the first quarter of the parameters $W_{N-1,T}$, $M_{N-1,T}$ and $V_{N-1,T}$ of the layer N−1 are transferred from the external memory 40 to the first memory 32. Also, the parameter error $\Delta W_{N-1}$ for the first quarter calculated by the second arithmetic part 20 and stored in the second memory 22 is transferred from the second memory 22 to the first memory 32.

In the operations (1), the first arithmetic part 30 uses the parameters $W_{N-1,T}$, $M_{N-1,T}$ and $V_{N-1,T}$ (¼) transferred to the first memory 32 and the parameter error $\Delta W_{N-1}$ (¼) to calculate the updated parameters $W_{N-1,T+1}$, $M_{N-1,T+1}$ and $V_{N-1,T+1}$ (¼). The calculated parameters $W_{N-1,T+1}$, $M_{N-1,T+1}$ and $V_{N-1,T+1}$ are transferred to the external memory 40. The parameters $W_{N-1,T}$ are transferred from the first memory 32 to the second memory 22 of the second arithmetic part 20.

Also, in the operations (2), (3) and (4), one-quarters of the data error $\Delta D_N$ and one-quarter of the data $D_{N-1}$ are used to calculate one-quarters of the parameter error $\Delta W_{N-1}$, similar to the operations (1). Also, one-quarters of the parameters $W_{N-1,T}$, $M_{N-1,T}$ and $V_{N-1,T}$ and one-quarters of the parameter error $\Delta W_{N-1}$ are used to calculate the updated one-quarters of the parameters $W_{N-1,T+1}$, $M_{N-1,T+1}$ and $V_{N-1,T+1}$. The calculated parameters $W_{N-1,T+1}$, $M_{N-1,T+1}$ and $V_{N-1,T+1}$ are transferred to the external memory 40, and the parameters $W_{N-1,T}$ are transferred from the first memory 32 to the second memory 22 of the second arithmetic part 20.

Note that after completion of the calculation of the parameter error $\Delta W_{N-1}$, the second arithmetic part 20 starts calculating the data error $\Delta D_{N-1}$. The divisional number of the calculation for the data error $\Delta D_{N-1}$ may differ from the divisional number of the calculation for the parameter error $\Delta W_{N-1}$. Also, the calculations may be collectively executed without division.

Figure 9:
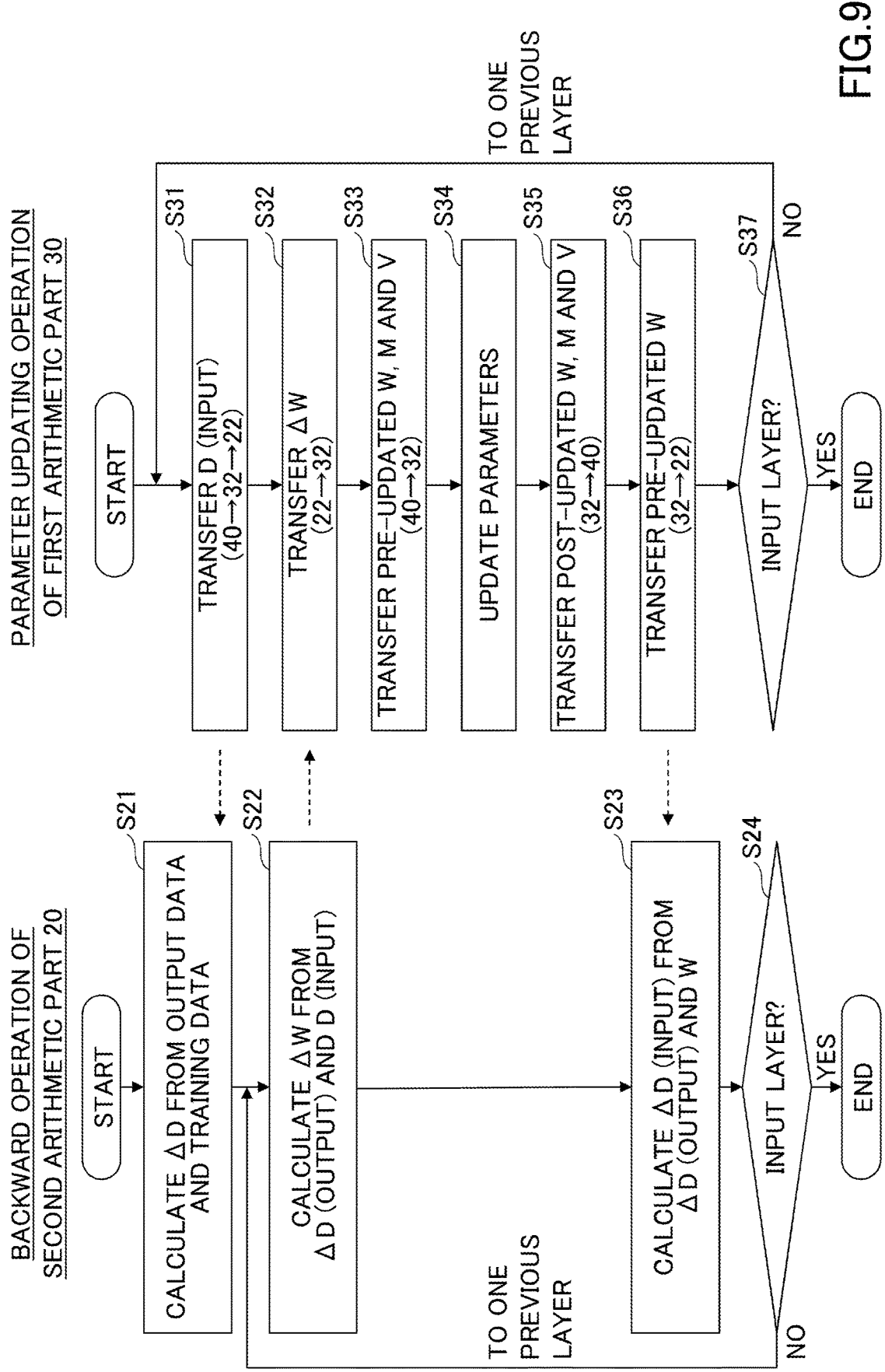
FIG. 9 is a flowchart for illustrating exemplary operations of a main arithmetic part and a sub-arithmetic part that perform the sequence in FIG. 7 according to one embodiment of the present disclosure.

FIG. 9 is a flowchart for illustrating exemplary operations of the second arithmetic part 20 and the first arithmetic part 30 for execution of the sequence as illustrated in FIG. 7. Namely, FIG. 9 illustrates an exemplary control method for the semiconductor device 10. For the same operations as those illustrated in FIGS. 4 and 7, the detailed description is omitted. The backward operation of the second arithmetic part 20 is performed after completion of the forward operation at the second arithmetic part 20. The parameter updating operation at the first arithmetic part 30 is performed corresponding to the progress of the backward operation at the second arithmetic part 20. In the example shown in FIG. 9, the parameter updating operation is performed in accordance with the ADAM method. However, the parameter updating operation may be performed in accordance with the Momentum-SGD or other methods.

First, at step S21, the second arithmetic part 20 uses output data calculated at the output layer in the backward operation and prepared teaching data to calculate the data error ΔD. Next, at step S22, the second arithmetic part 20 uses the data error ΔD (the output layer side) and input data D for the layer to calculate the parameter error ΔW. The calculated parameter error ΔW is used for the parameter updating operation at the first arithmetic part 30.

Next, at step S23, the second arithmetic part 20 uses the data error ΔD and the parameter W of the output side to calculate the data error ΔD of the input side. Next, in step S24, if an operation of the input layer is performed, the second arithmetic part 20 ends the operation. On the other hand, if an operation other than the input layer is performed, the second arithmetic part 20 returns to step S22 to perform an operation for the previous layer (the input layer side).

Meanwhile, at step S31, the first arithmetic part 30 transfers the input data D of the layer from the external memory 40 to the first memory 32 and further to the second memory 22. It should be noted that the first step S31 is an operation for the previous layer of the output layer. The input data D is used at step S22. Next, at step S32, the first arithmetic part 30 controls the first data transfer control unit 34 to transfer the parameter error ΔW calculated by the second arithmetic part 20 from the second memory 22 to the first memory 32.

At step S33, the first arithmetic part 30 controls the second data transfer control unit 35 to transfer the parameters W, M and V before updating from the external memory 40 to the first memory 32. Next, at step S34, the first arithmetic part 30 uses the parameters W, M and V before updating and the parameter error ΔW to calculate the parameters W, M and V after updating. Namely, the first arithmetic part 30 performs the parameter updating operation. Next, at step S35, the first arithmetic part 30 transfers the updated parameters W, M and V from the first memory 32 to the external memory 40.

Here, the transfer of the parameter error ΔW from the second memory 22 to the first memory 32 at step S32 and the transfer of the parameters W, M and V before updating from the external memory 40 to the first memory 32 at step S33 may be performed independently of each other. Namely, the first data transfer control unit 34 and the second data transfer control unit 35 transfer different information to each other. The band of the external memory 40 is large. Furthermore, in the parameter updating operation at the first arithmetic part 30 at step S34, the second bus EBUS and the first bus IBUS are not used. Accordingly, a portion of the operations of the steps S32, S33, S34 and S35 can be performed in duplicated timings. However, data and parameters for use in the parameter updating operation need to be stored in the first memory 32 before execution of the parameter updating operation.

As described with reference to FIG. 8, the operation of the second arithmetic part 20 at step S22 and the operations of the first arithmetic part 30 at the steps S32, S33, S34 and S35 may be segmented into a predetermined number of data pieces and a predetermined number of parameter groups and may be performed in multiple operations. Further, the transfer of data $D_{N-1}$ from the external memory 40 via the second bus EBUS may be segmented and performed in multiple operations.

Next, at step S36, the first arithmetic part 30 transfers the parameter W before updating from the first memory 32 to the second memory 22. Next, at step S37, if the parameter updating operation for the input layer is performed, the first arithmetic part 30 ends the operation. Also, if the parameter updating operation for layers other than the input layer is performed, the first arithmetic part 30 returns to step S31 to perform the operation for the previous layer (the input layer side).

In the embodiments as illustrated in FIGS. 7 to 9, instead of the second arithmetic part 20, the first arithmetic part 30 performs the parameter updating operation for the parameter W to shorten the total processing time of the backward operation and the parameter updating operation shown in FIG. 4, thereby reducing the band of the second bus EBUS. However, the operation performed by the first arithmetic part 30 is not limited to the parameter updating operation for the parameter W. For example, the first arithmetic part 30 may perform other operations to reduce the computational load on the second arithmetic part 20 and decrease the amount of data to be transferred from the external memory 40 to the second memory 22. Also, the type of the arithmetic units mounted to the first arithmetic unit 31 of the first arithmetic part 30 can be appropriately changed depending on the operation executed by the first arithmetic part 30. Also, instead of the second arithmetic part 20, the first arithmetic part 30 may be designed to perform the parameter updating operation and other operations. The first arithmetic unit 31 may be provided with the arithmetic units required to perform these operations.

The semiconductor device 10 for execution of the operation shown in FIG. 7 can efficiently perform the backward operation and the parameter updating operation without increasing the band of the second bus EBUS. Also, as shown in FIG. 8, if the parameter updating operation is divided and performed multiple times, occurrence of timings where the band of the external memory 40 is unused during reducing and broadcasting the parameters, can be avoided. Furthermore, since the second arithmetic part 20 does not perform the parameter updating operation in the semiconductor device 10, the second arithmetic part 20 and the first bus IBUS can be designed without consideration of the B/F ratio at execution of the parameter updating operation.

According to the present embodiment, the first arithmetic part 30 and the second arithmetic part 20 are configured to execute a single instruction sequence separately, so that the layer algorithm and the parameter updating operation can be executed in parallel. Accordingly, the present embodiment includes an arrangement for performing the layer algorithm and the parameter updating operation in parallel.

As another exemplary arrangement for performing the layer algorithms and the parameter updating operation in parallel, an arrangement where a single type of arithmetic unit capable of executing two or more instruction streams is coupled to an external memory via a global cache can be considered. In this arrangement, it is necessary to design the arithmetic part so that it can address any of the layer algorithm and the parameter updating operation that have very different B/F ratios, which may lead to increase in redundancy of circuit design. For example, although the arrangement where the arithmetic part is layered and each layer has an internal memory such as a primary cache or a secondary cache is not needed for the parameter updating operation, the arrangement may be installed for the layer algorithm due to significant effects from the standpoint of improved performance. However, according to this arrangement, data paths between the global cache and individual arithmetic units may become longer, which may lead to a longer total processing time. On the other hand, according to the first arithmetic part 30 of the present embodiment, the first arithmetic unit 31 and the first memory 32 can be mounted at physically close locations each other, and the parameter updating operation can be performed while decreasing occurrence of latency.

As still another example, an arrangement where the first arithmetic part 30 and the second arithmetic part 20 exchange data via an external memory may be considered. In this arrangement, the second arithmetic part 20 needs to write the parameter error $\Delta W$ to the external memory, and the first arithmetic part 30 need to read values of the parameter error $\Delta W$ from the external memory to perform the parameter updating operation. As a result, the frequency of accessing the external memory and the amount of data may be increased compared to the present embodiment. According to the arrangement, the increasing total processing time may be considered compared to the present embodiment.

Also, there may be cases where the second arithmetic part 20 stores the parameter error $\Delta W$ in itself without storage in the external memory 40, uses the stored parameter error $\Delta W$ to calculate an updated value of the parameter and stores the calculated updated value in the external memory 40. For example, if the ADAM is used to optimize parameters, the parameters M and V are required in addition to the parameters W for use in the layer algorithm, and these parameters M and V also need to be stored in the second arithmetic part 20. In this case, the capacity of the second memory 22 of the second arithmetic part 20 is likely to be insufficient. Also, it may not be efficient to store only the parameters M and V in the external memory 40 in order to avoid shortage of the buffer capacity.

Also, even in the case where the capacity shortage of the second memory 22 can be avoided by determining the updated value of the parameter W only from the parameter error $\Delta W$ without use of the parameters M and V, the convergence to the optimal value of the parameter W may be slowed, and the processing time of the parameter updating operation may be lengthened.

Further, it is considered that the band of the external memory 40 can be reduced by providing a cache memory between the second arithmetic part 20 and the external memory 40. For example, while the second arithmetic part 20 is transmitting and receiving the parameter W or the parameter error $\Delta W$ to and from the cache memory, the image data D or the like may be exchanged between the cache memory and the external memory 40.

Accordingly, even in the case where a bottleneck of the communication band due to the second calculation unit 20 occurs in communicating the parameter W or the parameter error $\Delta W$, a situation where the cache memory and the external memory 40 can always communicate to each other can be achieved. However, according to this method, even if the high speed external memory 40 is available, the band may be reduced. For example, in operations with a high B/F ratio such as the parameter updating operation, the band of the external memory 40 may become a bottleneck, and the processing time may be increased.

On the other hand, according to the present embodiment, the parameter updating operation at the first arithmetic part 30 can be performed in parallel with the operation for the layer algorithm at the second arithmetic part 20. For this reason, the situation where the first arithmetic part 30 and the external memory 40 can always communicate to each other can be achieved, and the band of the external memory 40 can be effectively used.

In this case, even if the band between the second arithmetic part 20 and the cache memory can be reserved, the band between the cache memory and the external memory 40 cannot be reserved, and for example, the parameter updating operation for parameters having a high B/F ratio may become a bottleneck in the entire sequence.

The B/F ratios of the operation for the layer algorithm and the parameter updating operation may differ significantly, and the B/F ratios of different layers may also differ significantly. This is because the balance among the computational amount, the input/output data size and the parameter size of the layer algorithm may vary depending on the image size, the number of channels or the like.

For example, in ResNet, which is a typical deep learning architecture for image processing, a total of four pooling operations are performed. For each pooling, the image size (area of the XY plane) generally becomes ¼, and the number of channels is doubled. Since the ResNet has been designed so that the computational amount of each layer is generally constant, communication of image data tends to be a bottleneck at layers closer to the input layer, whereas the computation or communication of weights tends to be a bottleneck at layers closer to the output layer. In particular, if computing nodes are assigned in accordance with the batch/image division, the image size and the batch size of images may be often set to be large so as to improve the utilization efficiency of the arithmetic units. In other words, in the typical deep learning architecture for image processing, the B/F ratio of the layer algorithm may be generally proportional to the image size fed to and from the layers and tend to be higher for the layers closer to the input layer and be lower for the layers closer to the output layer.

Accordingly, there is a significant difference in the B/F ratio between operations of the layer algorithm, computational amounts of which are dominant in the deep learning calculation. For this reason, the communication band of the external memory 40 needs to be designed so that a sufficient communication band can be secured even in the layers having a high B/F ratio, and it is accordingly difficult to reduce the band of the external memory 40 itself.

Further, by dynamically changing the clock frequency of the external memory 40 in accordance with the B/F ratio of the layer algorithm, it is possible to design a situation in which the external memory 40 and the cache memory can always communicate with each other. However, such a design may complicate the system configuration and interfere with stable operations of the semiconductor device. Also, since the parameter updating operation and the operation for the layer algorithm are not performed in parallel, the parameter updating operation and the operation for the layer algorithm must be performed at different timings.

On the other hand, according to the present embodiment, the parameter updating operation and the operation for the layer algorithm can be performed in parallel, and determination as to whether they are to be performed in parallel can be controlled by software. Therefore, for example, if the operation for the layer algorithm has a high B/F ratio, the parameter updating operation and the operation for the layer algorithm may not be performed in parallel, and if the operation for the layer algorithm has a low B/F ratio, the parameter updating operation and the operation for the layer algorithm may be performed in parallel. Accordingly, in the present embodiment, deep neural networks can be efficiently processed depending on different B/F ratios for different operations of the layer algorithm.

Although the present embodiment has an advantage over the above-stated examples, the present disclosure may include some or all of arrangements of the above-stated examples.

Figure 10:
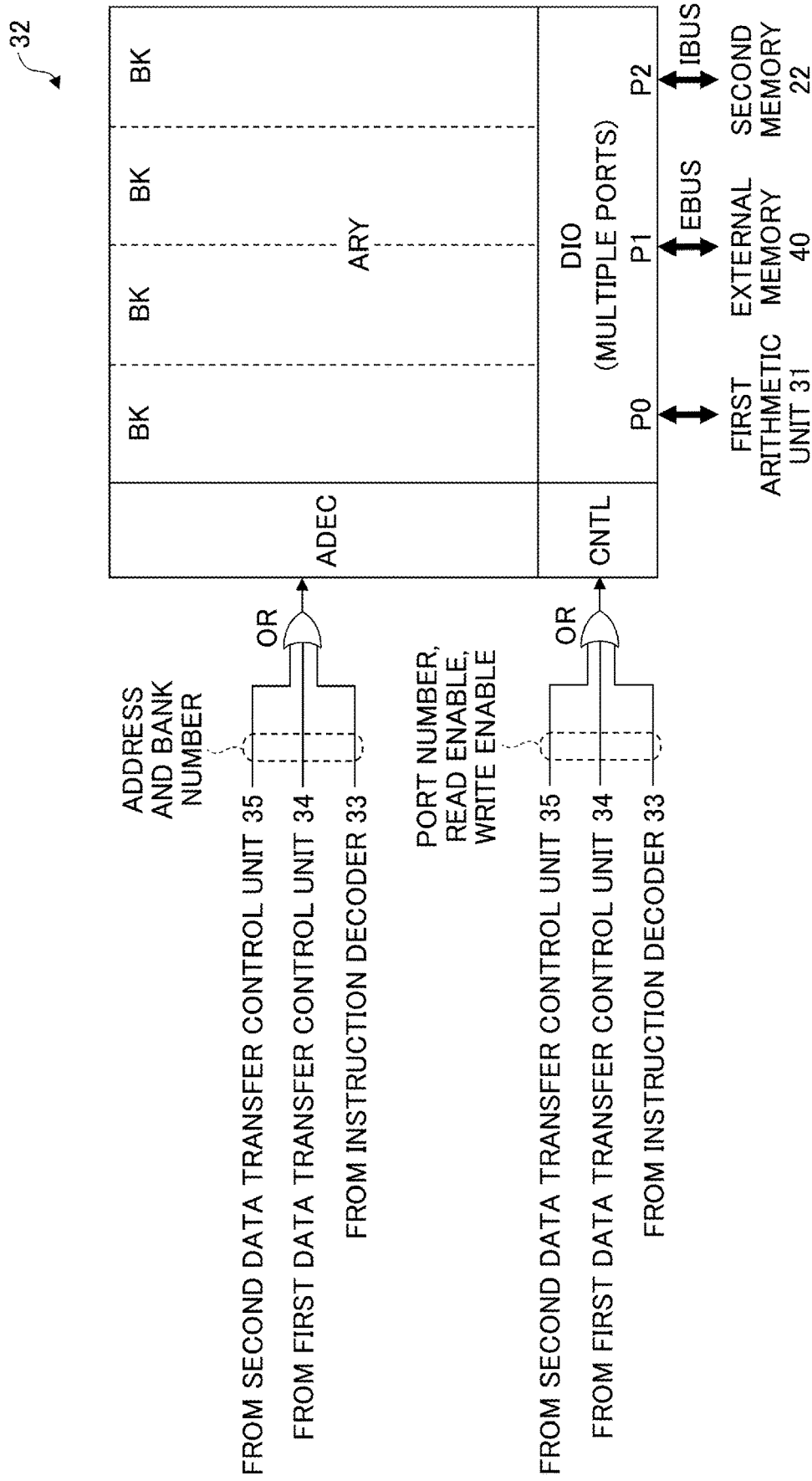
FIG. 10 is a block diagram for illustrating an exemplary internal memory in FIG. 1 according to one embodiment of the present disclosure.

FIG. 10 is a block diagram for illustrating an example of the first memory 32 in FIG. 1. The first memory 32 includes an operation control unit CNTL, an address decoder ADEC, a data input/output (I/O) unit DIO and a memory cell array ARY including a plurality of banks BKs (four in this example).

The address decoder ADEC determines which of the banks BKs is to be accessed based on a bank number received from the first data transfer control unit 34, the second data transfer control unit 35 or the instruction decoder 33 in FIG. 1 and selects a memory cell in the determined bank BK based on an address. The operation control unit CNTL controls operations of the memory cell array ARY and the data I/O unit DIO based on a control signal such as a port number, a read enable and a write enable received from the first data transfer control unit 34, the second data transfer control unit 35 or the instruction decoder 33.

The data I/O unit DIO connects any of the I/O ports Ps (P0, P1, P2) to the memory cell array ARY in accordance with the received port number to read and/or write data to the memory cell array ARY. The I/O port P0 is coupled to the first arithmetic unit 31, the I/O port P1 is coupled to the external memory 40 via the second bus EBUS, and the I/O port P2 is coupled to the second memory 22 of the second arithmetic part 20 via the first bus IBUS. For each access to the memory cell array ARY, data fed from or to the data I/O unit DIO may be, but not limited to, of bits of the n-th power of 2 (n is an integer greater than or equal to 4). If data for error detection and correction is added to data to be processed at the first arithmetic unit 31, the number of bits of the data may be the n-th power of 2 plus m bits (m is the number of bits of the data for error detection and correction).

The data I/O unit DIO feeds data read from any of the banks BK based on the read enable to one of the I/O ports Ps selected in accordance with the port number. The data I/O unit DIO feeds data received at the I/O port P selected in accordance with the port number to the bank BK selected by the bank number based on the write enable and writes the data to a memory cell in the bank BK.

Each of the port number, the address and bank number is formed of multiple bits, and the OR gate OR is provided for each signal line. The read enable and the write enable are 1-bit signals for indicating "enable" or "disable" depending on logic levels. If data is read from the memory cell array ARY, the read enable becomes the "enable" level, and if data is written to the memory cell array ARY, the write enable becomes the "enable" level.

In response to an operation instruction, the instruction decoder 33 shown in FIG. 1 feeds an address, a bank number, a port number for selecting the I/O port P0 and a read enable to the first memory 32 to read data for use in the first arithmetic unit 31 from the first memory 32. In response to completion of the operation at the first arithmetic unit 31, the instruction decoder 33 feeds an address, a bank number, a port number for selecting the I/O port P0 and a write enable to the first memory 32 to write an operation result to the first memory 32.

In response to a data transfer instruction of data from the external memory 40 to the first memory 32, the instruction decoder 33 feeds a read start address of the external memory 40, a write start address of the first memory 32, a transfer size and I/O information to the second data transfer control unit 35. In response to the information received from the instruction decoder 33, the second data transfer control unit 35 feeds a write address, a bank number, a port number for selecting the I/O port P1 and a write enable to the first memory 32.

In response to a data transfer instruction of data from the first memory 32 to the external memory 40, the instruction decoder 33 feeds a read start address of the first memory 32, a write start address of the external memory 40, a transfer size, and I/O information to the second data transfer control unit 35. In response to the information received from the instruction decoder 33, the second data transfer control unit 35 feeds a read address, a bank number, a port number for selecting the I/O port P1 and a read enable to the first memory 32.

In response to a data transfer instruction of data from the second memory 22 to the first memory 32, the instruction decoder 33 feeds a read start address of the second memory 22, a write start address of the first memory 32, a transfer size and I/O information to the first data transfer control unit 34. In response to the information received from the instruction decoder 33, the first data transfer control unit 34 feeds a write address, a bank number, a port number for selecting the I/O port P2 and a write enable to the first memory 32.

In response to a data transfer instruction of data from the first memory 32 to the second memory 22, the instruction decoder 33 feeds a read start address of the first memory 32, a write start address of the second memory 22, a transfer size and I/O information to the first data transfer control unit 34. In response to the information received from the instruction decoder 33, the first data transfer control unit 34 feeds a write address, a bank number, a port number for selecting the I/O port P2 and a write enable to the first memory 32.

Figure 11:
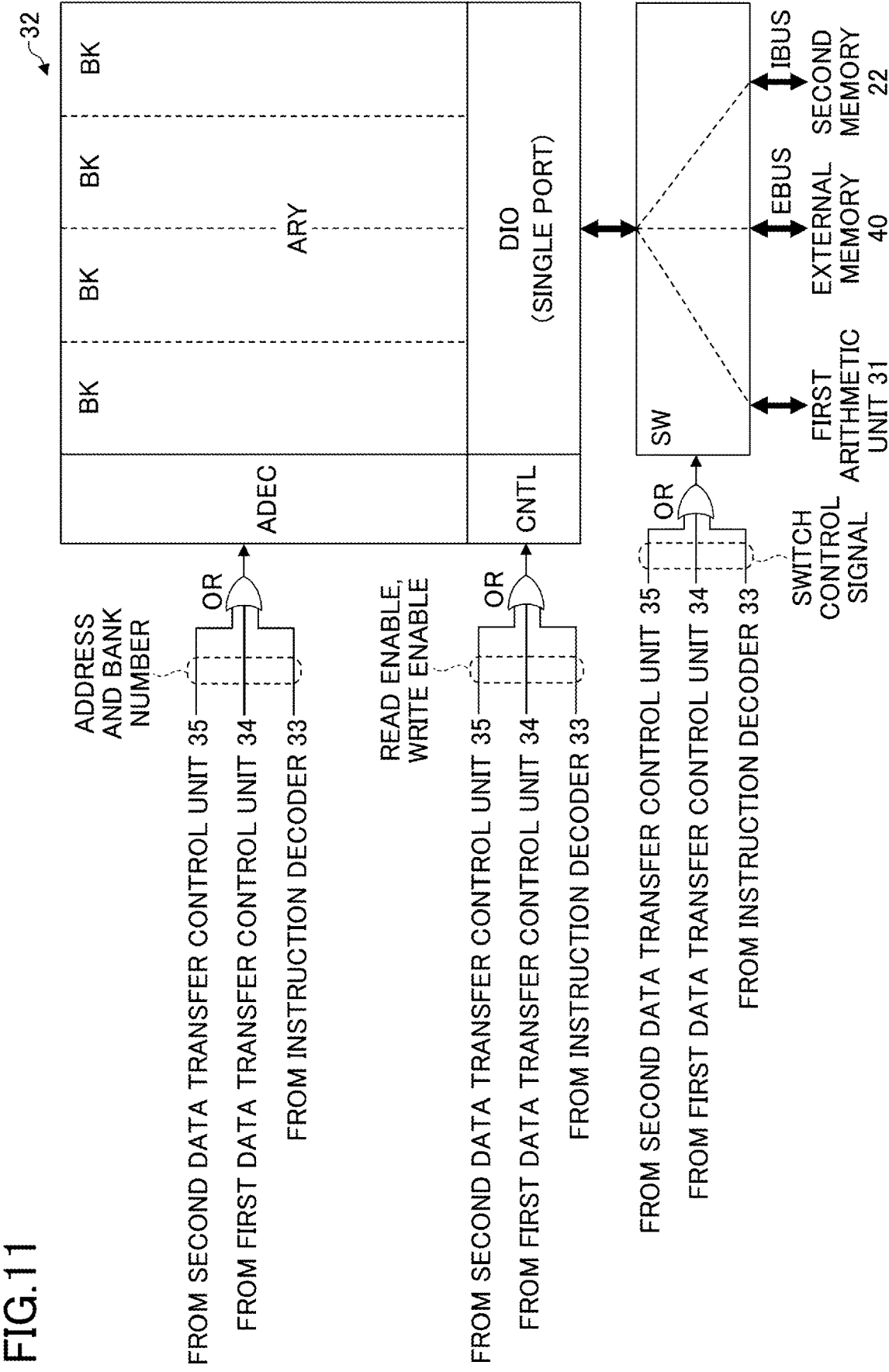
FIG. 11 is a block diagram for illustrating another exemplary internal memory in FIG. 1 according to one embodiment of the present disclosure.

FIG. 11 is a block diagram for illustrating another example of the first memory 32 in FIG. 1. For the same elements as those in FIG. 10, the detailed description is omitted. The first memory 32 shown in FIG. 11 includes a data I/O DIO of a single port type and a switch circuit SW coupled to the data I/O DIO. The other components of the first memory 32 are similar to those in FIG. 10.

In the first memory 32 shown in FIG. 11, since the data I/O unit DIO is of the single port type, in response to a read enable or a write enable, the operation control unit CNTL controls the transfer direction of data in the data I/O unit DIO without receiving the port number.

In response to a switch control signal received from any of the first data transfer control unit 34, the second data transfer control unit 35 and the instruction decoder 33 in FIG. 1, the switch circuit SW couples a data terminal of the data I/O unit DIO to the first arithmetic unit 31, the second bus EBUS or the first bus IBUS. The switch control signal is generated by the instruction decoder 33 shown in FIG. 1, instead of the port number shown in FIG. 10. The operation of the instruction decoder 33 and the operation of the first memory 32 are similar to the operation described with reference to FIG. 10.

Figure 12:
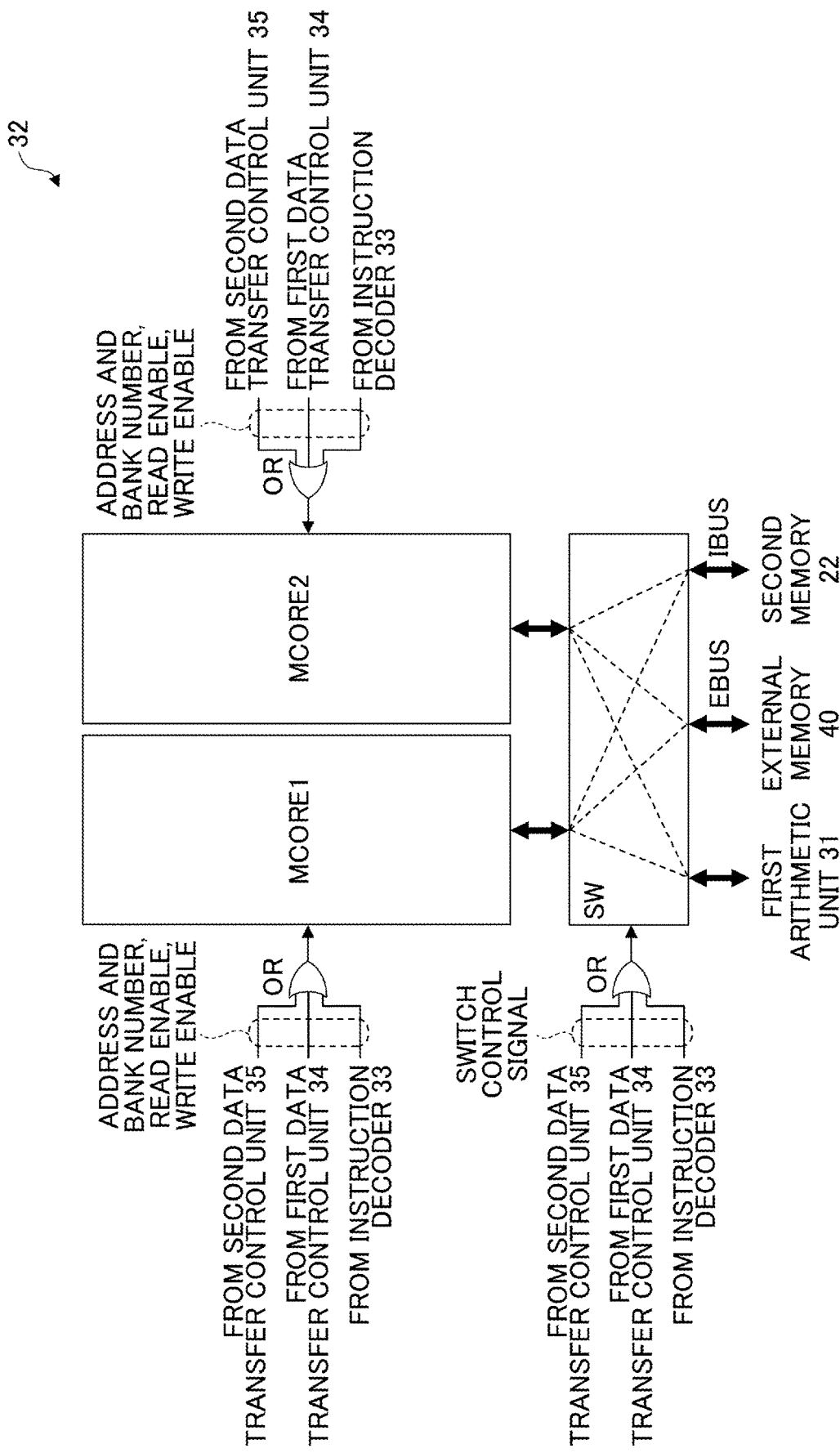
FIG. 12 is a block diagram for illustrating another exemplary internal memory in FIG. 1 according to one embodiment of the present disclosure.

FIG. 12 is a block diagram for illustrating another example of the first memory 32 in FIG. 1. For the same elements as those in FIGS. 10 and 11, the detailed description is omitted. The first memory 32 has a plurality of memory cores MCOREs (in this example, two MCORE1 and MCORE2) and a switch circuit SW. Similar to FIG. 10, each memory core MCORE may have an operation control unit CNTL, an address decoder ADEC, a data I/O unit DIO and a memory cell array ARY including a plurality of banks BKs, although they may not be illustrated. However, the data I/O unit DIO is of the single port type similar to that of FIG. 11, and each memory core MCORE does not receive a port number in the same manner as in FIG. 11. The data terminal of each memory core MCORE is coupled to the switch circuit SW.

Similar to the switch circuit SW in FIG. 11, the switch circuit SW receives a switch control signal from any of the first data transfer control unit 34, the second data transfer control unit 35 and the instruction decoder 33 in FIG. 1. Then, in response to the switch control signal, the switch circuit SW couples any one of data terminals of the memory core MCORE to the first arithmetic unit 31, the second bus EBUS or the first bus IBUS. The switch control signal is generated by the instruction decoder 33 shown in FIG. 1 and includes logic of the address that selects the memory core MCORE.

For example, the switch circuit SW may have a function to perform the connection between the memory core MCORE1 and the external memory 40 and the connection between the memory core MCORE2 and the first arithmetic unit 31 simultaneously. In this case, the logic of the switch control signal indicates combinations of connections between the memory cores MCORE1 and MCORE2 and the first arithmetic unit 31, the second bus EBUS and the first bus IBUS. The instruction decoder 33 decodes instructions (arithmetic instructions and data transfer instructions) corresponding to the number of combinations of the connections for the switch circuit SW. This allows a plurality of memory cores MCOREs to be simultaneously and independently accessed.

Figure 13:
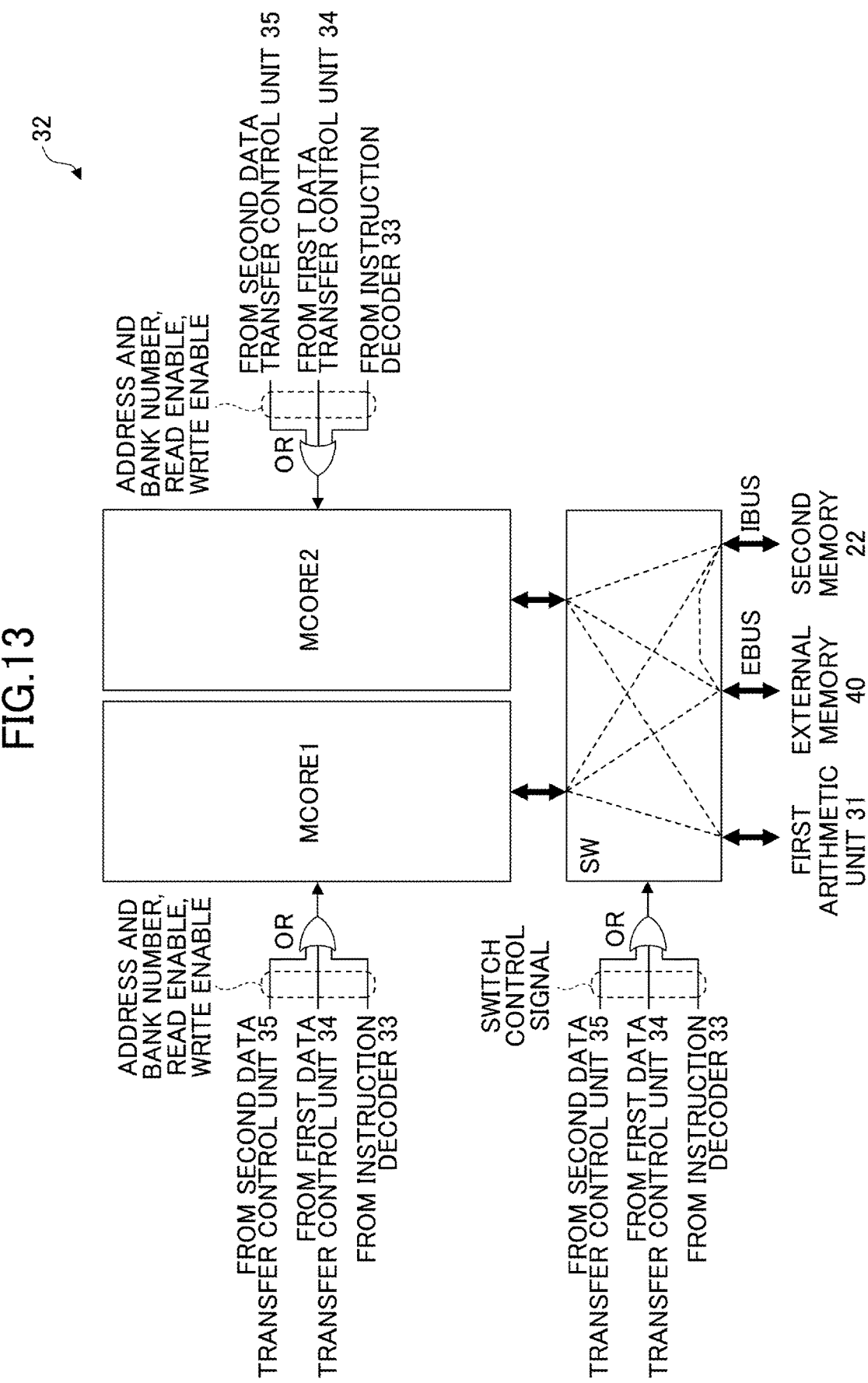
FIG. 13 is a block diagram for illustrating another exemplary internal memory in FIG. 1 according to one embodiment of the present disclosure.

FIG. 13 is a block diagram for illustrating another example of the first memory 32 of FIG. 1. For the same elements as those in FIG. 12, the detailed description is omitted. The first memory 32 shown in FIG. 13 is similar to the first memory 32 shown in FIG. 12, except that the switch circuit SW is different from the switch circuit SW shown in FIG. 12. The switch circuit SW is similar to the switch circuit SW of FIG. 12, except that the switch circuit SW has a path for interconnecting the second bus EBUS and the first bus IBUS.

The instruction decoder 33 shown in FIG. 1 has a function to decode a direct data transfer instruction for transferring data directly between the external memory 40 and the second memory 22 of the second arithmetic part 20. In other words, the semiconductor device 10 has an instruction set including the direct data transfer instruction.

When the instruction decoder 33 decodes the direct data transfer instruction, the instruction decoder 33 feeds a switch control signal for connecting the second bus EBUS to the first bus IBUS to the first memory 32. Also, the instruction decoder 33 feeds information for an access operation of the external memory 40 to the second data transfer control unit 35 and also feeds information for an access operation of the second memory 22 to the first data transfer control unit 34.

The second data transfer control unit 35 issues a read command or a write command to the external memory 40 based on information from the instruction decoder 33. The first data transfer control unit 34 issues a read command or a write command to the second memory 22 based on information from the instruction decoder 33. Accordingly, data can be transferred between the external memory 40 and the second memory 22 of the second arithmetic part 20 without writing data to the memory core MCORE of the first memory 32. For example, the data $D_{N-1}$ and $D_{N-2}$ shown in FIG. 7 can be transferred from the external memory 40 to the second memory 22 without writing the data $D_{N-1}$ and $D_{N-2}$ to the memory core MCORE.

Figure 14:
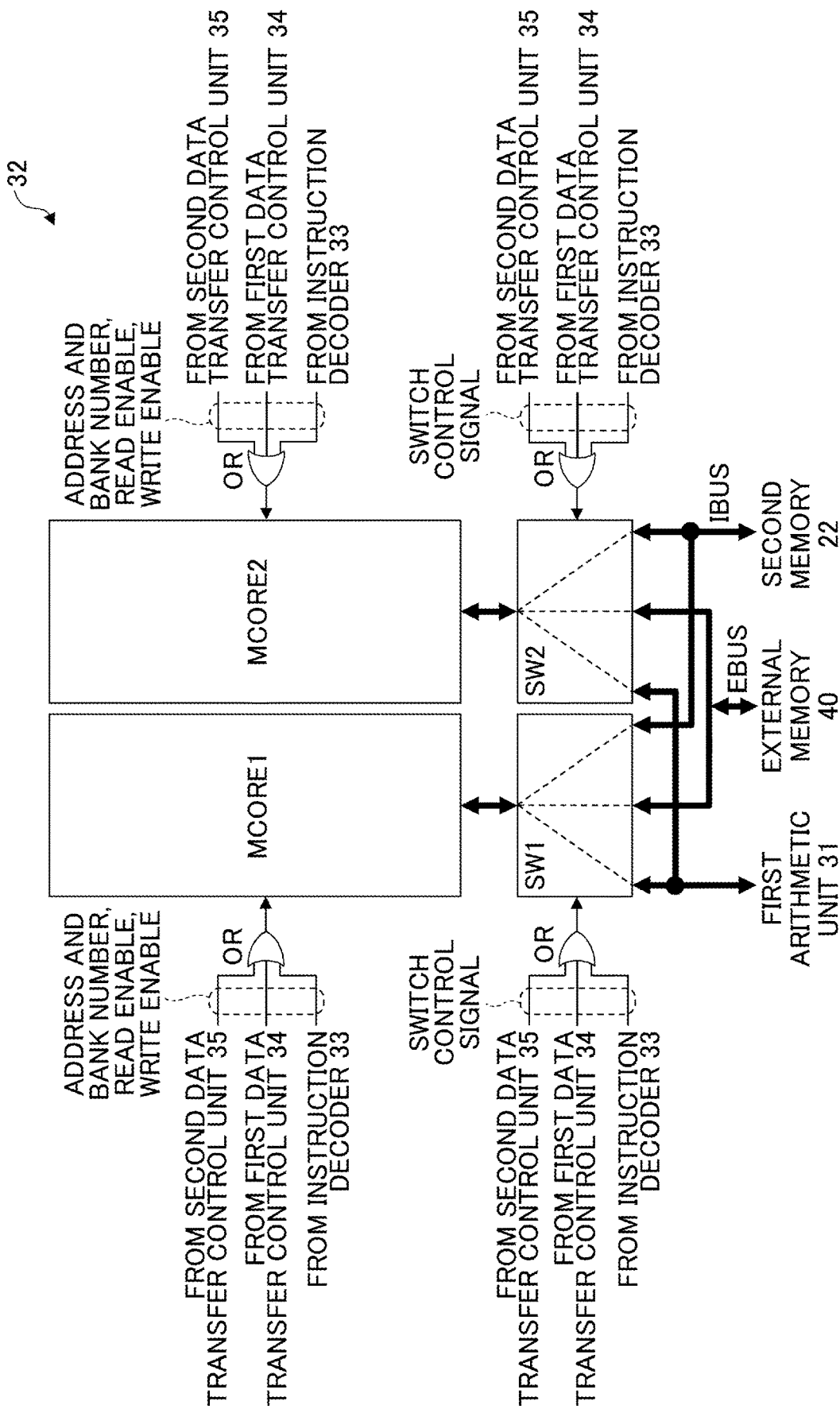
FIG. 14 is a block diagram for illustrating another exemplary internal memory in FIG. 1 according to one embodiment of the present disclosure.

FIG. 14 is a block diagram for illustrating another example of the first memory 32 in FIG. 1. For the same elements as those in FIGS. 11 and 12, the detailed description is omitted. In the first memory 32 shown in FIG. 14, switch circuits SWs (SW1, SW2) are provided for each memory core MCORE, and in response to receiving different switch control signals from the instruction decoder 33, the respective switch circuits SWs operate. The switch circuit SW is similar to the switch circuit SW shown in FIG. 11 and connects the data I/O unit DIO of the memory core MCORE (not shown) to the first arithmetic unit 31, the second bus EBUS or the first bus IBUS.

The switch control signal includes logic of an address that selects the memory core MCORE. This allows the first memory 32 to operate as two independent memories. Namely, the memory core MCORE1 can operate without being affected by the operation of the memory core MCORE2, and the memory core MCORE2 can operate without being affected by the operation of the memory core MCORE1.

As described above, in the present embodiment, the forward operation and the backward operation in a neural network are performed by the second arithmetic part 20, and the parameter updating operation is performed by the first arithmetic part 30 in the background of the backward operation. Also, a suitable number of arithmetic units having a specification suitable for the parameter updating operation are mounted to the first arithmetic part 30, and the parameter W for use in the backward operation is transferred from the first memory 32 instead of the external memory 40. Accordingly, the backward operation and the parameter updating operation can be efficiently performed corresponding to the band of the external memory 40 without decreasing the utilization efficiency of arithmetic units of both the second arithmetic part 20 and the first arithmetic part 30.

Also, since the backward operation and the parameter updating operation are performed in parallel, the time spanning from the start of the backward operation to the update of the parameter can be reduced. Further, the band of the second bus EBUS can be efficiently used by performing calculation of the parameter error ΔW in the backward operation and the parameter updating operation in parallel.

The first arithmetic part 30 can perform the parameter updating operation without storing the parameter error ΔW generated by the second arithmetic part 20 in the external memory 40. Also, the second arithmetic part 20 can calculate the data error ΔD by reading the updated value of the parameter W generated by the first arithmetic part 30 from the first memory 32 without reading it from the external memory 40. This allows reduction in data transfer to external memory 40, and the band of the second bus EBUS can be effectively used. Also, the power consumption of the semiconductor device 10 can be reduced.

The first arithmetic part 30 may perform other additional operations so as to not only reduce the computational load on the second arithmetic part 20 but also reduce the amount of data transferred from the external memory 40 to the second memory 22 based on an instruction. Namely, the operation performed by the first arithmetic part 30 is not limited to the parameter updating operation. Also in this case, the aforementioned effect can be obtained.

Figure 15:
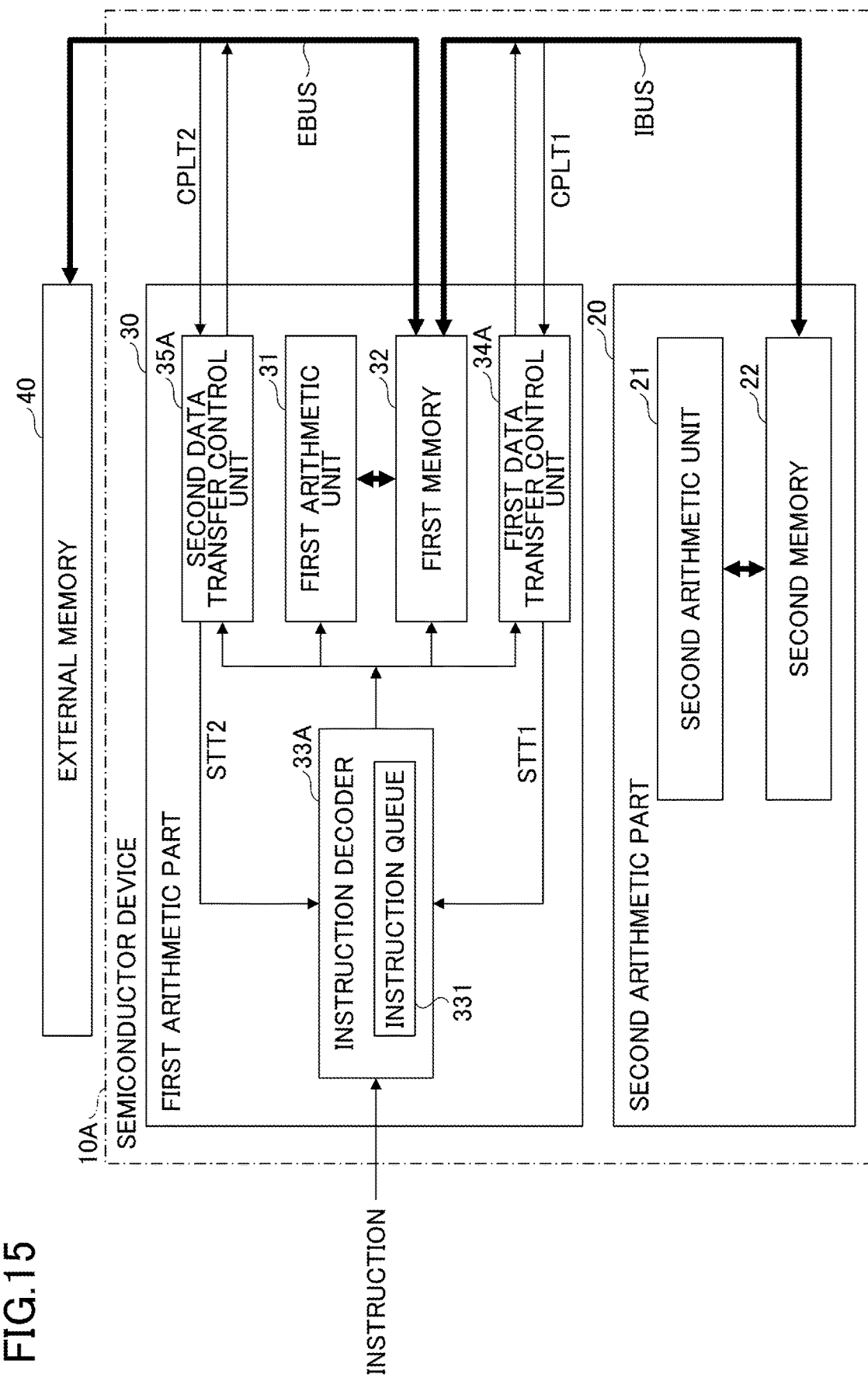
FIG. 15 is a block diagram for illustrating an exemplary semiconductor device according to another embodiment of the present disclosure.

FIG. 15 is a block diagram for illustrating an exemplary semiconductor device according to another embodiment of the present disclosure. For the same elements as those in FIG. 1, the same numerals are used, and the detailed description is omitted. A semiconductor device 10A shown in FIG. 15 includes an instruction decoder 33A, a first data transfer control unit 34A and a second data transfer control unit 35A, instead of the instruction decoder 33 and the first and second data transfer control units 34 and 35 in FIG. 1. Other components of the semiconductor device 10A are similar to the semiconductor device 10 shown in FIG. 1. The information processing apparatus including the semiconductor device 10A is the same as the information processing apparatus illustrated in FIG. 2.

The instruction decoder 33A has an instruction queue 331 (instruction buffer) for storing received instructions and decodes the instructions stored in the instruction queue 331. The instruction decoder 33A of the present embodiment can decode a waiting instruction for waiting an output of the instruction (decoding result). When the instruction decoder 33A decodes the wait instruction, the instruction decoder 33A stops decoding instructions and does not decode the instructions following the wait instruction until it receives a start signal STT (STT1, STT2) from one or both of the first data transfer control unit 34A and the second data transfer control unit 35A.

By providing the instruction queue 331, instructions following the waiting instruction can be stored in the queue, and a circuit (such as the instruction controller 60 in FIG. 2) that provides instructions to the instruction decoder 33A can provide instructions to the instruction decoder 33A without synchronization with the start signal STT. Note that the instruction queue may be located outside of the instruction decoder 33A.

The first data transfer control unit 34A may output the start signal STT1 in response to a completion signal CPLT1 received from the second arithmetic part 20 or in response to completion of data transfer. For example, the second arithmetic part 20 has a function to output the completion signal CPLT1 based on completion of data transfer instructed beforehand from the first data transfer control unit 34A.

The second data transfer control unit 35A may output the start signal STT2 in response to a completion signal CPLT2 received from the external memory 40 or in response to completion of data transfer. For example, the external memory 40 has a function to output the completion signal CPLT2 based on completion of data transfer instructed beforehand from the second data transfer control unit 35A.

FIG. 16 is a flowchart for illustrating an exemplary operation when the semiconductor device 10A in FIG. 15 performs the parameter updating operation. Namely, FIG. 16 shows an exemplary control method for the semiconductor device 10A. FIG. 16 shows operations corresponding to steps S32 to S34 shown in FIG. 8.

First, at step S41, the instruction decoder 33A decodes a data transfer instruction for loading the parameter error ΔW, which is calculated by the second arithmetic part 20 and is stored in the second memory 22, into the first memory 32. The instruction decoder 33A issues the decoded data transfer instruction (the first data transfer instruction) to the first data transfer control unit 34A. At step S42, the first data transfer control unit 34A controls the second memory 22 and the first memory 32 based on the first data transfer instruction to perform a transfer operation of the parameter error ΔW from the second memory 22 to the first memory 32. Steps S41 and S42 correspond to step S32 shown in FIG. 9.

At step S43, the instruction decoder 33A decodes a data transfer instruction for loading the parameters W, M and V stored in the external memory into the first memory 32 and issues the data transfer instruction (the second data transfer instruction) to the second data transfer control unit 35A. At step S44, the second data transfer control unit 35A controls the external memory 40 and the first memory 32 based on the second data transfer instruction to perform a transfer operation of the parameters W, M and V from the external memory 40 to the first memory 32. Steps S43 and S44 correspond to step S33 shown in FIG. 9. Note that the order of steps S41 and S42 and steps S43 and S44 may be reversed and may be performed in parallel.

Next, at step S45, the instruction decoder 33A decodes a waiting instruction corresponding to the first and second data transfer instructions of steps S41 and S43 and stops an instruction decoding operation. The instruction decoder 33A may receive two waiting instructions corresponding to the two data transfer instructions or a waiting instruction common to the two data transfer instructions. The instruction decoder 33A can decode a new waiting instruction while stopping the instruction decoding operation. Therefore, even if the instruction decoder 33A receives two waiting instructions consecutively and stops decoding the instructions based on the first waiting instruction, the instruction decoder 33A can decode the second waiting instruction.

Next, at step S46, the second data transfer control unit 35A waits reception of the completion signal CPLT2 and upon receiving the completion signal CPLT2, feeds the start signal STT2 to the instruction decoder 33A at step S47. At step S48, the first data transfer control unit 34A waits reception of the completion signal CPLT1 and upon reception of the completion signal CPLT1, feeds the start signal STT1 to the instruction decoder 33A at step S49. Steps S45 and S46 and steps S47 and S48 may be performed in the reverse order and may be performed in parallel.

If the second data transfer control unit 35A itself can determine whether transfer of the parameter W, M and V to the first memory 32 has been completed, in response to completion of the transfer, the second data transfer control unit 35A may output the start signal STT2 without receiving the completion signal CPLT2. Similarly, if the first data transfer control unit 34A itself can determine whether transfer of the parameter error ΔW to the first memory 32 has been completed, in response to completion of the transfer, the first data transfer control unit 34A may output the start signal STT1 without receiving the completion signal CPLT1.

At step S50, upon receiving the start signals STT1 and STT2 corresponding to the two data transfer instructions, the instruction decoder 33A determines that the transfer operations for the two data transfer instructions have been completed and resumes decoding the instructions. For example, the instruction decoder 33A receives and decodes an instruction for the parameter updating operation and issues the operation instruction to first arithmetic unit 31. At step S51, the first arithmetic unit 31 uses the parameters W, M and V and the parameter error ΔW transferred to the first memory 32 to update the parameters W, M and V. Step S51 corresponds to step S34 shown in FIG. 9. As shown in FIG. 8, in the case where the parameter updating operation is divided into multiple pieces for execution, the operation shown in FIG. 16 is performed for the parameter updating operation of each of the divided pieces.

As stated above, according to the present embodiment, the backward operation and the parameter updating operation can be performed corresponding to the band of the external memory 40 without deteriorating the utilization efficiency of arithmetic units of both the second arithmetic part 20 and the first arithmetic part 30, similar to the above-described embodiment. Further, according to the present embodiment, even if the backward operation and the parameter updating operation are performed separately by the second arithmetic part 20 and the first arithmetic part 30 that can operate independently of each other, the operations can be synchronized through the wait instruction. Namely, the parameter updating operation can be initiated in synchronization with completion of the transfer of the parameter error ΔW and the parameters W, M and V for use in the parameter updating operation. Accordingly, the unnecessary waiting time before the parameter updating operation is avoidable, and the backward operation and the parameter updating operation can be performed efficiently. As a result, the time spanning from the start of the backward operation to the parameter updating operation can be further reduced.

The present disclosure is not limited to the above-stated specific embodiments, and various variations and modifications can be made without deviating from the scope of claims.

What is claimed is:

1. A processing system, comprising:
a first chip including one or more first processors; and
a second chip including one or more second processors,
wherein, for a weight of a neural network to be updated, the one or more second processors execute a backward operation of the neural network and calculate a gradient of the weight, the calculated gradient is transferred to the one or more first processors, and the one or more first processors update the weight based on the calculated gradient,
wherein the one or more first processors transfer the updated weight to the second chip,
wherein the one or more first processors update the weight of the neural network in accordance with a method using multiple types of parameters, the one or more first processors updating two or more types of parameters, and the multiple types of parameters including the weight and the two or more types of parameters,
wherein the one or more second processors do not update the multiple types of parameters, and
wherein the two or more types of parameters are updated to update the weight.

2. The processing system as claimed in claim 1, wherein the one or more second processors further execute a forward operation of the neural network.

3. The processing system as claimed in claim 1, wherein the first chip and the second chip are separate.

4. The processing system as claimed in claim 1, wherein the one or more second processors communicate with an external memory via the one or more first processors.

5. The processing system as claimed in claim 1, wherein the one or more first processors update the two or more types of parameters based on the calculated gradient.

6. The processing system as claimed in claim 1, wherein each of the two or more types of parameters is updated based on the calculated gradient, and the weight is updated based on the updated two or more types of parameters.

7. The processing system as claimed in claim 1, wherein the backward operation and the updating of the weight are performed in parallel.

8. The processing system as claimed in claim 1, wherein the calculated gradient is not transferred to an external memory.

9. The processing system as claimed in claim 1, wherein only the updated weight in the multiple types of parameters is transferred to the one or more second processors.

10. The processing system as claimed in claim 1, wherein the one or more first processors are connected to a high bandwidth memory.

11. A processing method for execution by a first chip including one or more first processors, and a second chip including one or more second processors, the processing method comprising:
executing, for a weight of a neural network to be updated, by the one or more second processors, a backward operation of the neural network and calculating, by the one or more second processors, a gradient of the weight, the calculated gradient being transferred to the one or more first processors; and
updating, by the one or more first processors, the weight based on the calculated gradient,
wherein the one or more first processors transfer the updated weight to the second chip,
wherein the updating of the weight includes updating the weight of the neural network in accordance with method using multiple types of parameters, the one or more first processors updating two or more types of parameters, and the multiple types of parameters including the weight and the two or more types of parameters,
wherein the one or more second processors do not update the multiple types of parameters, and
wherein the two or more types of parameters are updated to update the weight.

12. The processing method as claimed in claim 11, further comprising executing, by the one or more second processors, a forward operation of the neural network.

13. The processing method as claimed in claim 11, wherein the first chip and the second chip are separate.

14. The processing method as claimed in claim 11, wherein the one or more second processors communicate with an external memory via the one or more first processors.

15. The processing method as claimed in claim 11, wherein the one or more first processors update the two or more types of parameters based on the calculated gradient.

16. The processing method as claimed in claim 11, wherein the one or more first processors are synchronized with the one or more second processors.

17. The processing method as claimed in claim 11, wherein each of the two or more types of parameters is updated based on the calculated gradient, and the weight is updated based on the updated two or more types of parameters.

18. The processing method as claimed in claim 11, wherein the calculated gradient is not transferred to an external memory.

19. The processing method as claimed in claim 11, wherein only the updated weight in the multiple types of parameters is transferred to the one or more second processors.

20. One or more non-transitory computer readable media storing therein one or more programs which, when executed by a first chip including one or more first processors and a second chip including one or more second processors, perform a method comprising:
executing, for a weight of a neural network to be updated, by the one or more second processors, a backward operation of the neural network and calculating, by the one or more second processors, a gradient of the weight, the calculated gradient being transferred to the one or more first processors; and updating, by the one or more first processors, the weight based on the calculated gradient, wherein the one or more first processors transfer the updated weight to the second chip, wherein the updating of the weight includes updating the weight of the neural network in accordance with method using multiple types of parameters, the one or more first processors updating two or more types of parameters, and the multiple types of parameters including the weight and the two or more types of parameters, wherein the one or more second processors do not update the multiple types of parameters, and wherein the two or more types of parameters are updated to update the weight.

\* \* \* \* \*